United States Patent
Icove et al.

(10) Patent No.: US 8,493,212 B2
(45) Date of Patent: Jul. 23, 2013

(54) PASSIVE MICROWAVE SYSTEM AND METHOD FOR PROTECTING A STRUCTURE FROM FIRE THREATS

(75) Inventors: David J. Icove, Knoxville, TN (US);
Carl T. Lyster, Knoxville, TN (US);
David M. Banwarth, Dayton, MD (US)

(73) Assignee: Icore and Associates, LLC, Knoxville, TN (US)

( * ) Notice: Subject to any disclaimer, the term of this patent is extended or adjusted under 35 U.S.C. 154(b) by 358 days.

(21) Appl. No.: 12/985,940

(22) Filed: Jan. 6, 2011

(65) Prior Publication Data
US 2011/0155397 A1 Jun. 30, 2011

Related U.S. Application Data

(63) Continuation-in-part of application No. 12/759,224, filed on Apr. 13, 2010, now Pat. No. 7,884,717, which is a continuation of application No. 11/931,399, filed on Oct. 31, 2007, now Pat. No. 7,724,134.

(60) Provisional application No. 60/944,217, filed on Jun. 15, 2007.

(51) Int. Cl.
*G08B 13/18* (2006.01)

(52) U.S. Cl.
USPC ........ 340/567; 169/61; 340/539.26; 340/584; 340/628

(58) Field of Classification Search
USPC ......... 340/584, 693.5, 693.9, 539.26, 539.27, 340/539.29, 567, 565, 628; 239/75, 71; 169/61, 169/60, 56, 16; 52/168
See application file for complete search history.

(56) References Cited

U.S. PATENT DOCUMENTS

| | | |
|---|---|---|
| 2,274,784 A | 3/1942 | Geertz |
| 3,063,502 A | 11/1962 | Lakind |

(Continued)

FOREIGN PATENT DOCUMENTS

| | | |
|---|---|---|
| DE | 3147775 | 6/1983 |
| EP | 1944591 | 7/2008 |

(Continued)

OTHER PUBLICATIONS

"Sprinkler-Protected Glazing in Fire-Resistant Wall Assemblies," May 2008, Building Code Variance STANDATA, pp. 1-3.

(Continued)

*Primary Examiner* — Thomas Mullen
(74) *Attorney, Agent, or Firm* — Cameron LLP

(57) ABSTRACT

An automatic fire suppression system used to provide protection of window glass and other structural elements in aircraft terminals which are exposed to exterior fires caused by natural, accidental, or intentional events comprises a directional passive microwave receiver, a central processor for processing received microwave signals over time and comparing the received signals over time with thermal event signatures stored in memory to selectively actuate a sprinkler system for protecting the window glass in the vicinity of an identified fire event. The memory may further store a model of the aircraft terminal, and the processor utilizes a fire dynamics simulator to simulate a thermal event at the terminal. A related fire suppression process involves the detection of incipient fires through an array of exterior passive microwave heat sensor fire detectors connected to an electronic control processor which identify zones such as 30 to 100 linear foot zones of exterior glass surface and automatically initiates an array of quenching sprinkler heads applying water to the exposed surfaces of glass and other structural elements in response to detection of an identified fire event by its signature.

20 Claims, 14 Drawing Sheets

U.S. PATENT DOCUMENTS

| | | | |
|---|---|---|---|
| 3,583,490 A * | 6/1971 | McFadden | 169/16 |
| 3,583,637 A | 6/1971 | Miscovich | |
| 3,986,183 A | 10/1976 | Fujiwara | |
| 4,091,876 A * | 5/1978 | Valdatta | 169/16 |
| 4,181,179 A | 1/1980 | Batte | |
| 4,330,040 A * | 5/1982 | Ence et al. | 169/16 |
| 4,416,552 A | 11/1983 | Hessemer, Jr. et al. | |
| 4,462,022 A | 7/1984 | Stolarczyk | |
| 4,499,470 A | 2/1985 | Stacey | |
| 4,532,932 A | 8/1985 | Batty, Jr. | |
| 4,583,869 A | 4/1986 | Chive et al. | |
| 4,605,012 A | 8/1986 | Ringeisen et al. | |
| 4,645,358 A | 2/1987 | Blume | |
| 4,715,727 A | 12/1987 | Carr | |
| 4,798,209 A | 1/1989 | Klingenbeck et al. | |
| 4,845,629 A | 7/1989 | Murga | |
| 5,083,618 A * | 1/1992 | Hayes | 169/16 |
| 5,176,146 A | 1/1993 | Chive | |
| 5,302,024 A | 4/1994 | Blum | |
| 5,370,458 A | 12/1994 | Goff | |
| 5,526,676 A | 6/1996 | Solheim et al. | |
| 5,576,972 A | 11/1996 | Harrison | |
| 5,578,988 A | 11/1996 | Hoseit et al. | |
| 5,677,988 A | 10/1997 | Takami et al. | |
| 5,688,050 A | 11/1997 | Sterzer et al. | |
| 5,692,571 A | 12/1997 | Jackson | |
| 5,724,666 A | 3/1998 | Dent | |
| 5,727,634 A | 3/1998 | Ishida | |
| 5,785,426 A | 7/1998 | Woskov et al. | |
| 5,793,288 A | 8/1998 | Peterson et al. | |
| 5,796,353 A | 8/1998 | Whitehead | |
| 5,829,877 A | 11/1998 | Baath | |
| 6,133,839 A | 10/2000 | Ellul | |
| 6,167,971 B1 * | 1/2001 | Van Lingen | 169/16 |
| 6,188,318 B1 | 2/2001 | Katz et al. | |
| 6,342,845 B1 | 1/2002 | Hilliard | |
| 6,384,414 B1 | 5/2002 | Fisher et al. | |
| 6,450,264 B1 * | 9/2002 | Christian | 169/16 |
| 6,543,933 B2 | 4/2003 | Stergiopoulos et al. | |
| 6,724,467 B1 | 4/2004 | Billmers et al. | |
| 6,729,756 B2 | 5/2004 | Sezai | |
| 6,767,129 B2 | 7/2004 | Lee et al. | |
| 6,773,159 B2 | 8/2004 | Kim et al. | |
| 6,900,756 B2 | 5/2005 | Salmon | |
| 6,932,776 B2 | 8/2005 | Carr | |
| 7,052,176 B2 | 5/2006 | Stephan et al. | |
| D524,407 S * | 7/2006 | Crowley | D23/214 |
| 7,121,719 B2 | 10/2006 | Lee et al. | |
| 7,148,815 B2 | 12/2006 | Derringer | |
| 7,197,356 B2 | 3/2007 | Carr | |
| 7,256,818 B2 | 8/2007 | Sadok | |
| 2004/0000410 A1 | 1/2004 | Burns | |
| 2004/0194848 A1 | 10/2004 | Sauer | |
| 2007/0221388 A1 | 9/2007 | Johnson | |
| 2008/0106437 A1 | 5/2008 | Zhang | |
| 2008/0251733 A1 | 10/2008 | Anderton | |
| 2009/0284405 A1 | 11/2009 | Salmon et al. | |

FOREIGN PATENT DOCUMENTS

| | | |
|---|---|---|
| FR | 2627865 | 9/1989 |
| WO | 9714941 | 4/1997 |
| WO | WO9724160 | 7/1997 |
| WO | WO2004019298 | 3/2004 |
| WO | WO2005/052524 | 6/2005 |

OTHER PUBLICATIONS

Shpilberg, David et al., Airport Study/Fire Technology, "Best Choice of Fire Protection: An Airport Study," pp. 5-14, 1974.

Seo, Joseph, "Unique Fire Suppression Design for Singapore Airlines Hanger," Emergency Forum on Emergency and Risk Management, Jan. 2005, pp. 1-10.

Ryder, Noah L. et al., "Consequence Modeling Using the Fire Dynamics Simulator," 2003, pp. 1-9.

Kim, A. K., "Protection of Glazing in Fire Separations by Sprinklers," Interflam '93, Mar. 1993, pp. 1-13.

Custer, Richard et al., "Miami Airport QTA: risk-informed performance-based fire protection," pp. 1-4, ARUP Journal, Feb. 2005.

Kim, A. K. et al., "Fire Protection of Windows Using Sprinklers," NRC CNRC, 1997, Construction Technology Update No. 12, pp. 1-4, 2010.

Babrauskas, Vytenis, "Glass Breakage in Fires," Fire Science and Technology, Inc., pp. 1-7.

Airbus, "Flight Operations Briefing Notes, Ground Handling, Refueling with Passengers on Board," pp. 1-7, Aug. 2007.

Fire Protection Association Australia, "External Water Spray Systems to Aid Building Protection from Wildfire," Jul. 2000, pp. 1-49.

Interagency Helicopter Operations Guide, Chapter 13, Fueling Operations, Mar. 2006, pp. 13-1 to 13-22.

International Search Report for PCT US2007/083287, Oct. 21, 2008.

CRAF Handbook for Radio Astronomy, European Science Foundation, 2005.

Kaiser, Thomas et al.; Is Microwave Radiation Useful for Fire Detection?, 12th International Conference on Fire Detection, 2001, NIST, Gaithersburg, MD, pp. 1-16.

Ruser, H. et al., Fire Detection with a Combined Ultrasonic-Microwave Doppler Sensor, 1998 IEEE Ultrasonics Symposium, pp. 489-492.

Grosshandler, William L., NISTIR 5555, A Review of Measurements and Candidate Signatures for Early Fire Detectio, Jan. 1995.

Thuillard, M., A New Flame Detector Using the Latest Research on Flames and Fuzzy-Wavelet Algorithms, Fire Safety Journal 37, 2002, Elsevier, pp. 371-380.

Kempka, Thorsten, Microwaves in Fire Detection, Fire Safety Journal 41, 2006, Elsevier, pp. 327-333.

Luo, Ren C. et al., Fire Detection and Isolation for Intelligent Building System Using Adaptive Sensory Fusion Method, Proceedings of the 2002 IEEE International Conference on Robotics & Automation, pp. 1777-1781.

Dong, Weizhen et al., A Kalman-Tracker-Based Bayesian Detector for Radar Interference in Radio Astronomy, 2005, IEEE, pp. 657-660.

Dicke, R. H., The Measurement of Thermal Radiation at Microwave Frequencies, The Review of Scientific Instruments, vol. 17, No. 7, Jul. 1946, pp. 268-273.

* cited by examiner

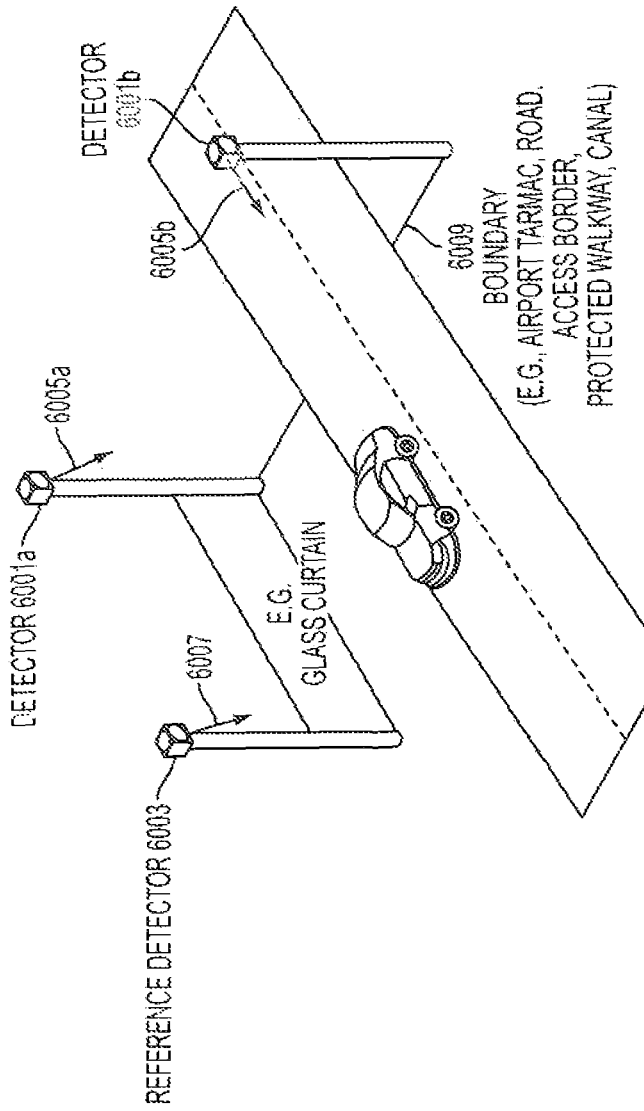

PASSIVE MICROWAVE SYSTEM AND METHOD FOR PROTECTING A STRUCTURE FROM FIRE THREATS

RELATED APPLICATIONS

The present application is a continuation-in-part of U.S. application Ser. No. 12/759,224, filed Apr. 4, 2010 (now U.S. Pat. No. 7,884,717 Feb. 8, 2011), which is a continuation of U.S. application Ser. No. 11/931,399 filed Oct. 31, 2007, (now U.S. Pat. No. 7,724,134 issued May 24, 2010), which claims priority to provisional U.S. Application Ser. No. 60/944,217, filed Jun. 15, 2007, the disclosures of which are incorporated by reference into the present application in their entirety.

BACKGROUND OF THE INVENTION

1. Field of the Invention

The present invention relates generally to fire protection and suppression systems and, in particular, to a fire protection and suppression system for protecting a structure from interior or exterior fire threats using passive microwave radiation reception, for example, a structure including a glass curtain wall.

2. Description of the Related Art

Aircraft terminal structures, such as passenger corridors leading to parked airplanes, are sometimes faced with the threat of fire. These threats include natural, accidental, or intentional events, such as in the refueling operations of aircraft, the operation of emergency power generators using nearby, stored liquid or gaseous fuels or intentional criminal assaults on the structure. Other structures faced with similar fire threats include airport hangars, other maintenance buildings, rental car facilities, parking lots and hotels that may be typically present at airports. Outside an airport setting, state, local and federal government agency buildings including embassies in foreign countries may be the target of an intentional fire threat.

It has been estimated that since 1961 there have only been a total of eight aircraft damaged during refueling while there have been thousands of fuel spillage events worldwide. Injuries related to refueling of aircraft are rare. It is also rare but known that aircraft landing at an airport may collide with aircraft preparing to take off or may collide with objects, inadvertently drive off a runway and in at least one instance, overrun a length of runway and land in a body of water. The limited history of airport fires and accidents is testimony to the safety procedures in place at airports worldwide. Nevertheless, there have been embassy and hotel bombings and other criminal assaults and the like on structures involving fire events that have in fact proved damaging to the structures involved and resulted in the loss of human lives.

Many structures are protected from internal fires through an interior fire suppression system, such as interior automatic sprinkler systems. Exterior protection systems are more rare. Valuable structures are often left unprotected from exterior fire threats such as radiant heat generated from a fuel fire during aircraft refueling operations, exposure from fires in neighboring structures, or burning embers that are blown onto the structure from a nearby fire, for example, a brush or forest fire. Intentional fire threats may include but not be limited to the intentional use of a so-called Molotov cocktail as an example. Unprotected structures frequently may include window structures that may comprise glass curtain structures having a height in excess of one story and a width in excess of tens of feet or meters. Indeed, some airport terminals are designed to provide a continuous glass curtain structure in both a main terminal area and along concourses to aircraft gates where aircraft load and unload passengers. Especially hotel lobby areas are often similarly provided with large window curtain structures at their entrances facing a street. Such glass structures may be the weakest structures in the face of fire and break inwardly in the event of a fire threat such as a fuel explosion or exposure to elevated levels of radiant heat from fuel fires or other exterior fire or severe heat exposures, especially single pane glass windows. Window breakage permits unabated direct exposure of a building's interior and its occupants to potential flames and superheated products of combustion, thereby jeopardizing the life safety of the occupants and the building itself.

When an aircraft passenger terminal is faced with an impending fire, particularly those in which large panes of glass are the only barrier between the passengers traversing interior corridors and awaiting a parked aircraft, the resources available to local firefighters are limited. The interior sprinkling system may not activate in a timely manner due to an exterior fire and lives and property inside the terminal may be lost. Moreover, manual actuation of a sprinkling system intended to protect interior (or exterior) glass panes may be required and may be forgotten by untrained airport personnel. Airport fire personnel may arrive too late to save lives and property. Known exterior fire sprinkler systems include so-called water curtain systems which utilize solenoid valves to control a plurality of spaced water spray nozzles to establish a protective curtain of water. Such water curtain systems are utilized, for example, on board off-shore oil rigs to separate, for example, an intentional gas burn-off from personnel and property on the rig. Such water curtain systems require a considerable water flow, not typically available to other facilities. An oil rig has an unlimited supply of water from, for example, an ocean or gulf while an airport may rely on decorative ponds or water supply tanks to supplement a city water main. A hotel building may have to rely only on a city water main for a sprinkler system water supply. On the other hand, a water curtain may be established on a window by a directed spray of water permitting the water to equally flow by gravity down a glass surface.

For example, extinguishment of an impending fire during a refueling operation of a parked aircraft may be limited to the availability of responding firefighters from a nearby station. During the time to detect, notify, and initiate firefighting operations, an incipient fire may grow in size as to severely impact exposed passenger corridors, causing breakage of unprotected large glass windows as well as damaging other exterior structural elements, aircraft, vehicles and airport personnel. Once the fire enters the terminal corridors, conditions become untenable for passengers and other occupants. On the other hand, internal fire sprinkler systems may finally actuate automatically due to internal fire and smoke sensors or manually by airport personnel noticing the external fire.

Fire protection engineering concentrates on the detection of both flaming and smoldering fire signatures, typically through the design of heat, smoke, and optical detectors and combinations of such detectors and arrays. Flame and radiation detectors can be used to monitor for the presence of sparks, burning embers and flames. Ultraviolet and infrared detectors can also be used to detect fire by sensing electromagnetic radiation at ultraviolet and infrared frequencies. An example of a flame detection apparatus is represented by WO 2005/052524 and products available from Micropack (Engineering) Limited of Scotland. The fire detection apparatus includes a closed circuit television system for protecting an area in the field of view of a camera. The lens to the camera is intentionally filtered to receive at, for example, 761 nm in order to be able to distinguish sunlight from a hydrocarbon fire. Moreover, control electronics may provide image analysis known in the art to recognize a real fire while ignoring unwanted alarms. Flame detection generally in the ultraviolet or infrared or combination light range of frequencies is susceptible to false alarms such as intentional setting off of flares, lightning and the like.

Thermal sensing differentiates a temperature of an object from that of a predetermined steady state. For example, U.S. Pat. No. 6,724,467 to Billmers et al., describes a system and method for viewing objects at a fire scene by discriminating reflections from an object from smoke and fire. Some limited tests also have utilized acoustic sensors for fire detection.

Consequently, thermal and flame sensors are often used in combination with smoke detectors. Smoke detectors operate upon the detection of particulate matter from smoke in the air. Particle and smoke detectors use photoelectric, ionization, carbon monoxide, gas-sensing, and photo beam technologies to sense byproducts of combustion. However, these devices also are not infallible, and may falsely trigger from, for example, cigarette or cigar smoke. Moreover, one or both of the thermal and smoke detectors may be slow to react to a growing fire, thus leading to greater risk to property or life. In addition, the presence of smoke can complicate the detection of fires. Studies show that 90% of wood smoke particles are smaller than 1 micron in size. Particles from oil smoke are in the 0.03 to 1 micron range, while particles from cooking smoke from grease are in the 0.01 to 1 micron size, as is tobacco smoke. Consequently, discrimination among types of smoke is difficult. Discrimination may require sophisticated pattern recognition algorithms and detector sensors to reduce the nuisance sensitivity (see L. A. Cestari, et al., "Advanced Fire Detection Algorithms using Data from the Home Smoke Detector Project," Fire Safety Journal, 40 (2005), 1-28). In an airport or hotel exterior environment, smoke from an external fire may be subjected to wind flow and so smoke detectors, even those located proximate to a refueling fire or intentional fire, may not detect the fire.

Electromagnetic waves are created when charged particles such as electrons change their speed or direction. These electromagnetic waves consist of an electric field and a magnetic field perpendicular to the electric field. The oscillations of these fields are reflected in the frequency and wavelength of the electromagnetic wave. The frequency is the number of waves (or cycles) per second. The energy of these waves may also be characterized in terms of the energy of photons, massless particles of energy traveling at the speed of light that may be emitted at certain discrete energy levels. The following mathematical relationship demonstrates a relationship among the wavelength of an electromagnetic wave, its frequency, and its energy:

$$\lambda = \frac{c}{f} = \frac{hc}{E}$$

where
$\lambda$=wavelength (meters)
c=speed of light ($3 \times 10^8$ meters per second)
f=frequency (Hertz)
h=Planck's constant ($6.63 \times 10^{-27}$ erg-seconds)
E=energy of the electromagnetic wave (ergs)

Wavelength and frequency are the inverse of one another as related by the speed of light, and may be used interchangeably herein in the description of embodiments and the claims as equivalents of one another. Note that the energy of an electromagnetic wave is proportional to the frequency and is inversely proportional to the wavelength. Therefore, the higher the energy of the electromagnetic wave, the higher the frequency, and the shorter the wavelength.

The spectrum of electromagnetic waves is generally divided into regions or spectra, classified as to their wavelength or, inversely, as to their frequency. These bands of wavelengths (frequencies) range from short to long wavelengths (high to low frequency) and generally consist of gamma rays, x-rays, ultraviolet, visible light, infrared, microwave, and radio waves. The term "microwave" generally is used to refer to waves having frequencies between 300 Megahertz (MHz) (wavelength=1 m) and 300 Gigahertz GHz (wavelength=1 mm). Microwave radiation is highly directional, and the higher the frequency, the more directional the emitted radiation.

The radiation from electromagnetic waves can be emitted by thermal and non-thermal means, depending upon the effect of the temperature of the object emitting the energy. Non-thermal emission of radiation in general does not depend on the emitting object's temperature. The majority of the research into non-thermal emission concerns the acceleration of charged particles, most commonly electrons, within magnetic fields, a process referred to in the astrophysics field as synchrotron emission. For example, astrophysicists and radio astronomers look for synchrotron emissions from distant stars, supernovas, and molecular clouds.

On the other hand, thermal emission of radiation from electromagnetic waves depends only upon the temperature of the object emitting the radiation. Raising the temperature of an object causes atoms and molecules to move and collide at increasing speeds, thus increasing their accelerations. The acceleration of charged particles emits electromagnetic radiation which forms peaks within the wavelength spectrum. There may be a direct correlation in changes in temperature impacting the accelerations of the composite particles of an object with the frequency of the radiation and peaks within the spectrum. Once an object reaches its equilibrium temperature, it re-radiates energy at characteristic spectrum peaks. Such microwave radiation will be referred to herein as spectral microwave radiation to distinguish from black body radiation which is an inherent property of different objects, plant and animal life.

Prior attempts to create an exterior fire suppression system have proven to be impractical. For example, U.S. Pat. No. 3,576,212, entitled "FIRE-SHIELDING DEVICE," which issued on Apr. 27, 1971, describes a system in which four structures are installed adjacent to each of four exterior walls of a building. Each structure extends from the ground to a height above the roof of the building and includes a pipe that is connected to a water source at the bottom of the structure. At the top of each structure is a pair of sprinkler heads, one designed to spray water in a horizontal direction and another designed to spray water in a high arc to be spread over the roof, for example, by the wind. Such a structure may be useful to protect an aircraft terminal building or hotel roof.

Another approach is described in U.S. Pat. No. 5,263,543, entitled "EXTERNAL FIRE PREVENTION SYSTEM," which issued on Nov. 23, 1993. In this patent, a water pipe is run up the side of a building and connected to another pipe that lies across the top of the roof. The second pipe includes a plurality of sprinklers that are spaced apart. A smoke detector is placed on the side of the building to detect an approaching fire and automatically activates and deactivates the external fire prevention system in the event of detection of smoke.

Such a system may protect the roof of an airport terminal or other structure in the event of a significant fire event detected by a smoke detector.

Known airport safety procedures include bonding and grounding an aircraft to be refueled to a refueling tanker truck or a pump vehicle for an underground fuel storage tank. Moreover, the electrical systems of an aircraft to be refueled may be shut down during refueling. Use of radio frequency devices and other electrical devices such as any electrical switch may be restricted during fueling operations. Sprinkler systems are known that are buried underground and pop up to douse fires with an arc of water emitted from pop-up nozzles. These can be used to protect aircraft and vehicles from fire spread but can consume much water and may require underground water tank storage. Such safety measures have decreased the number of fires during refueling and such sprinkler systems decreased the severity of fire damage. On the other hand, owners of hotels and other structures that may have large glass exterior surfaces and hotel managers are generally not capable of controlling the events that occur outside the hotel premises. Moreover, the possibility still exists that an unforeseen event will occur at an airport notwithstanding the safety measures in place to prevent it.

Dr. Vytenis Babrauskas has yearly, since 1996, published his article: "*Glass Breakage in Fires,*" available from Fire Science and Technology Inc. In it, Babrauskas describes that ordinary flat glass tends to crack when the glass reaches a temperature of about 150-200° C. A window subject to an outside fire is primarily impacted by radiation. While local gas temperatures may be near-ambient, vapor laden air from a fuel spill may result in an explosion or significant overpressure leading to a rupture and unintended ignition, not discussed by Babrauskas, such that there may be no convective cooling flow along a glass surface as the radiant heat is transported by a velocity toward the glass.

Andrew Kim in his paper, "*Protection of Glazing in Fire Separations by Sprinklers,*" *Interflam* '93, pp. 83-93 provides results of testing protecting of tempered and heat-strengthened glass by providing a water film on the assembly. Kim describes two primary factors for successful protection: early activation and sufficient water spray. Activation in less than one minute provided for no failure in over one hundred twenty minutes when a sprinkler is mounted at top center of the tempered glass. Internally fed misting nozzles are available for mounting at top center of exterior windows with, for example, a 160° spray pattern that may conserve water but still provide a sufficient water film.

Custer et al., *Miami Airport QTA: risk-informed performance-based fire protection,*" *The Arupp Journal*, February 2005, pp. 44-47, provides the results of a computer simulation of the explosive range of a gasoline leak from a fueling station after 120 seconds. FIG. 2, at page 46, tends to show a washing effect on a face of a Rate structure of a Miami airport concourse model with a pass-through to the other side of the passenger concourse model portion. The model shows that the concourse may receive fire and explosive impact temperatures along an approximately 50 meter distance on either side of a fuel explosion measured perpendicularly to the concourse (typically an elongated, narrow structure of hundreds of meters in length). As a consequence, Custer et al. recommend ultraviolet and infrared sensors to detect flame in fuel dispensing areas.

Referring to FIGS. 2A and 2B, the results of a fire dynamics simulator model utilized by Ryder et al. will be discussed as described in *Consequence Modeling Using the Fire Dynamics Simulator*, NIST, 2003, 9 pages. FIGS. 2A and 2B represent the results of a simulation of a large (15 m diameter) pool fire of jet fuel. Radiant flux was measured at approximately 17 and 25 meters from the pool. As can be seen from a comparison of FIGS. 2A and 2B, the impact of wind on the results dramatically increased the amount of radiation seen by the target and where the target was 8 meters away, it was engulfed by fire. Unburned vapors extended beyond the diameter of the pool and effectively increased the size of the fire. As can be seen from FIG. 2A, after approximately 100 seconds, a radiant temperature in no wind exceeded 200° C. In the presence of wind per FIG. 2B, the results were less predictable and scattered and the temperature increased from 20° C. at about 20 seconds to 140° C. at 120 seconds and then dissipated. These results are consistent with the Custer et al. model results. Convective heat transfer via wind in both models would appear to impact flux flow and radiative transport may be considered more significant in a no wind environment.

Typical fueling regulations in place at airports such as the Denver Municipal Airport impose additional restrictions to bonding/grounding and the like described above including distance restrictions on airport personnel from smoking and distance restrictions, on the order of 50 feet, from fueling operations from the airport terminal, automatic shut-off valves, shutting down of aircraft engines and equipping tanker trucks and the like with anti-spark exhaust systems. Hotels and other structures with large glass structures may not so impose restrictions on the public passing on public streets. Both Denver and Baltimore Washington International airports utilize fuel containment systems. By sloping the tarmac proximate a refueling away from the refueling and terminal, fuel may be caused to drain to fuel containment tanks buried in the tarmac and located outwardly from the terminal.

Referring now to prior art FIG. 1, wherein similar reference numbers are used to represent similar elements of FIG. 3 and other figures relating to embodiments and various aspects, the first number of a reference number represents the figure number wherein the element first appears. In FIG. 1, a refueling operation at Baltimore Washington International (BWI) airport is shown. The depicted refueling operation utilizes a fuel pumping cart 105 for pumping fuel under control of controller 130 located where the fuel enters the plane wing at fuel entry point 115. Cart 105 is moved to a refueling underground fuel hydrant location and is placed there by a vehicle which has been removed from the scene. A controller 130 is operated by an airport employee for operating the pumping cart 105 once the fuel lines are connected to the plane wing fuel entry point 115 from the cart 105 and from the cart 105 to the underground tank in the proximity of the cart 105. The controller 130 provides an indication of electrical bonding of wing to cart and grounding of both and an emergency cut-off, for example, for use if the airport employee notes a fuel spill.

With continued reference to FIG. 1. BWI airport has a deluge sprinkler system for its exterior windows 110. Combination rate-of-rise, fixed temperature thermal detectors 140 are located approximately every other window pane which operate, for example, at a rate-of-rise of 15° F. per minute or a fixed temperature of one of 135° and 194° F. These are shaped as half-moons, flat side down, such that heat thermally conducted up a pane is captured and its temperature sensed. When the temperature rate of increase exceeds a predetermined level or the maximum pre-determined fixed temperature limit is exceeded, an exterior deluge sprinkler valve is actuated which delivers water to adjacent sprinkler heads 135. A disadvantage of the BWI system is the requirement for a large number of combination rate-of-rise, fixed temperature detectors and the limitations of mere thermal sensing without utilizing other thermal event detection alternatives including flame and smoke detection.

Airport hangars such as those at Dubai International Airport and Singapore Airport are protected for under-wing fires by mounting fire detectors at below wing height, for example, at 3 meters. For example, three band infrared camera detection of fires under an airplane wing may be used at this height. Hangars typically have very high ceilings and a smoke detector and associated sprinkler system deployed at ceiling height is less effective than one at lower height. A smoke detector, for example, mounted on a ceiling may take valuable minutes to detect a fire while using UV/IR flame detection can cut the detection time to ninety seconds. A hotel lobby may be analogous and have high ceilings. Consequently, it may be appropriate to provide UV/IR flame detection and heat detection as preferred detection means for high ceiling structures. Sprinkler systems may cause considerable damage and require gravity flow to reach a fire. Water may be delayed in falling due to evaporation and air resistance. Consequently, more time may be needed for water or foam/water to reach a fire from a high ceiling than from a sprinkler system at a lower height. Typical water pressures may be set above 250 kPa to provide an initial downward velocity to fire retardant for sprinkler system operation to speed the retardant's reaching a fire below.

These and other prior art approaches suffer from many drawbacks including false alarms that have prevented the widespread implementation of exterior and interior fire suppression systems, particularly to protect aircraft terminals, hotels, hangars with valuable contents, airplanes and other structures, for example, that may be equipped with large glass curtain structures. For example, no such systems exist that allow for the detection of incipient fires using passive microwave detector arrays that may operate to detect fires in all ranges of weather and climatic conditions and through typical walls and obstacles.

A German 2001 NIST paper suggests that Daimler Chrysler Aerospace AG conducted earlier experiments in fire detection using microwave energy (T. Kaiser et al., "Is Microwave Radiation Useful for Fire Detection?" *Proceedings of the 12$^{th}$ International Conference on Automatic Fire Detection,* AUBE '01, Volume 965, Mar. 26-28, 2001, Gaithersburg, Md., NIST Special Publication). The purpose of these experiments, which is not further explained, was to detect fires in garbage bunkers. The possibility of using microwave engineering technologies in passive fire detection is also described in the NIST Conference paper in 2001 by Kaiser et al. which further describes the use of microwaves to passively detect a fire using a conventional Dicke switch operated at 1 KHz to compare a reference temperature of a room wall with measurements at 11 GHz in the microwave region and a bandwidth of 1 GHz. (See R. H. Dicke, "The measurement of thermal radiation at microwave frequencies," *Rev. Scl. Instr.* Vol. 17, pp. 268-275, 1946). The discussed technique relies upon thermal radiation from fires generating a detectable signal in the microwave portion of the electromagnetic spectrum. To do so, Kaiser et al. further suggest use of a commercial satellite dish and a superheterodyne low noise converter to measure the microwave radiation of a target test fire.

Kempka et al. in 2006 expand the work of Kaiser et al. to detection and sensing from the use of infrared and microwave at 11 GHz to frequencies from 2 to 40 GHz (T. Kempka et al., "Microwaves in Fire Detection," *Fire Safety Journal*, Volume 41, 2006, pp. 327-333) in the microwave spectrum. According to this 2006 publication, thermal radiation may be measurable utilizing four broadband antennas to cover four separate frequency bands of operation, i.e., 2-12, 12-18, 18-26, and 26-40 GHz bands of operation and respective bandwidths at 100 MHz each. "For each configuration one sample will be measured in the first frequency band. Then the receiver changes to the next frequency band and takes another sample. After all the selected frequency bands are measured, the receiver will measure the first band again."

In view of the drawbacks in the prior art, there is a need for an improved exterior fire suppression system, particularly in aircraft passenger terminals and such structures as hotels with large glass curtain structures to protect personnel and property as well as the structure itself during a fire event.

SUMMARY OF THE INVENTION

The present invention is an exterior fire suppression system that overcomes many of the drawbacks found in the prior art systems. In a preferred embodiment, an exterior fire suppression system includes at least one sprinkler that is connected to a water supply of a structure or a secondary water source. The quenching sprinkler is mounted in the exterior frame of a window structure and may be substantially hidden from view when the system is inactive. When activated, the sprinkler may pop down from a window transom or ceiling structure and saturate a portion of the structure's exterior window and other structural elements with a deflected water spray, providing the structure with protection from external fire threats before the extreme temperatures of the fire reach the structure. The water spray need not consume large volumes of water to effectively cool an exterior pane surface. It would be desirable for the system to be aesthetically pleasing and capable of effectively saturating the structure's exterior windows and other structural elements using the water pressure that is available to use during a fire emergency. It would further be desirable for the system to be easy to operate without endangering the safety of the occupants and firefighters and inexpensive to install or retrofit into existing structures of various sizes and shapes. Moreover, a plurality of known sensors such as infrared temperature and smoke detectors may be supplemented with directional passive microwave antenna arrays in one or more embodiments in WARC protected microwave frequency bands including, but not limited to 1400 to 1427 MHz. This frequency range, for example, has an ability to be received through smoke, flying debris, obstacle walls of many materials and the like. These directional antenna arrays may be located, for example, on known lighting poles at an antenna airport for directionally locating a fire event. A fire event may be distinguished in its characteristics from known temperature signatures such as that of an aircraft actuating its engines or an automobile or other airport vehicle turning on its engine and operate the exterior sprinkler system to protect a terminal (or hotel). By fire signature is intended the passively received measured value of radiation over time that may be characteristic of a heat event. A structure to be protected may be protecting in a manner suggested by that shown in the simulation model discussed above, for example, on the order 50 meters of glass curtain or wall length on either side of the detected heat/fire/flame event.

Each known different type of fire, flame or smoke sensor may be susceptible to false alarms. Consequently, an aspect of various embodiments is to reduce the susceptibility to false alarms. An intelligent processor may make rational inferences about input parameters which may include but are not limited to current weather conditions including temperature, barometric pressure, wind velocity and direction and whether the sun is shining or hidden by clouds. Other inputs may include time of day and date so that normalized or predicted conditions for that particular day may be related to a triggering of a false alarm by a particular type of detector. For example, as will be discussed further herein, a wind velocity and direction may help to qualify the detection of smoke by a particular smoke detector as to the direction toward the source of the smoke. Moreover, a spatial map of the area surrounding the smoke or other type of detector in connection with typical conditions such as exhaust smoke from a gas powered vehicle operating in a vicinity may be discounted.

In accordance with an aspect, some sensor types, including passive microwave, are directional in nature. Consequently, the location of a fire event may be distinguished according to a fire signature such as a fuel spill fire signature. Such a fuel spill fire may be, for example, distinguished from an aircraft jet engine activation over time or lightning from a thunderstorm or flares or the like, as independent signatures, one being a dangerous fire and the other potentially being a false alarm. Other false alarms may be indicated by an intelligent processor such as a lightning strike during a thunderstorm by a combination of factors including weather/barometric reading as well as passive microwave signature over time.

The sprinkler system may operate in all environments. For example, a deluge water sprinkler system in accordance with one embodiment may operate with a deluge valve for controlling a plurality of deflector sprinklers within the approximately 100 meter length of an aircraft refueling operation (for example, per gate) comprising a first zone. A second zone operable from the same deluge control system may be an interior terminal zone. In an alternative embodiment, individual solenoid valves may be selectively actuated to define a rolling plurality of sprinklers along a distance defined by the location of the external fire once located using triangulation via the above-described passive microwave directional receivers, by infrared thermal image sensing, other flame detection, rate-of-rise, smoke or other detection means in combination.

Radio astronomy is internationally allocated certain bands of frequencies for research purposes according to the 1979 International Telecommunication Union's World Administrative Radio Conference, also known as "WARC-79," (J. Cohen, et al., *CRAF Handbook for Astronomy, Committee on Radio Astronomy Frequencies*, European Science Foundation, 3d Ed. (2005)). These bands are restricted to reception only and so are free of microwave active transmission. These bands therefore are also relatively free of any noise when used for passive detection, for example, from the stars or planets. Use of passive reception of microwave frequencies at these internationally protected frequencies within the microwave radiation spectra may guarantee that the directional passive microwave signal reception is free of interference from active microwave radiation from radio transmitters (which operation would be prohibited in the area).

Some of the WARC-79 allocated bands are reserved as "PRIMARY exclusive." These PRIMARY exclusive bands include 21.850 to 21.870 MHz, providing a 20 KHz wide band; 1.400 to 1.427 GHz, providing a 27 MHz band; 2.690 to 2.700 GHz, providing a 10 MHz band, 10.680 to 10.700 GHz, providing a 20 MHz band; 15.350 to 15.400 GHz, providing a 50 MHz band; and 23.600 to 24.000 GHz, providing a 400 MHz band. In addition, some bands are labeled as "PRIMARY exclusive" but are restricted according to region of the Earth's surface. Using a very low band such as 21.850 to 21.870 practically insures penetration through walls and metal. For example, an electrical fire inside an aircraft may be detected by measuring radiation level at this frequency over time and comparison with a similar fire event test signature.

Other frequencies also are set aside and require "Notification of Use" when someone wishes to transmit on these frequencies. These frequencies include 4.950 to 4.990 GHz, providing a 40 MHz band. The 1.6 to 1.7 GHz band is utilized for missile tracking radar, but the chances of interference in a passive fire detection system would be low. Still others are "PRIMARY shared with active."

In any of these shared with active frequency bands, the timed presence of active microwave frequencies and the channels present in a passively received signal may be known to a passive receiver so that the active frequency can be distinguished and ignored. For example, 1.400 to 1.427 GHz provides a completely protected bandwidth of 27 MHz. A wider band than 27 MHz may be received at an antenna and block converted. Alternatively, the output can be narrowed by a bandpass filter. Also, conventional low noise amplifiers may pass a band of interest and provide gain as will be further discussed herein. In addition, passive microwave reception at this frequency range may be combined with reception of microwave radiation at other microwave frequencies outside this range, and known anomalies or other noise interference can be filtered or discriminated using conventional processes from the resulting signal. Moreover, other microwave frequencies including or overlapping the internationally protected bands may be detected over wider bandwidths such as 100 MHz to several GHz. Detection of fires by microwave engineering techniques relies upon the fact that thermal radiation from fires generates a detectable signal in the microwave portion of the electromagnetic spectrum which, like the microwave radiometer, can create a measurable change in voltage output which is proportional to a temperature and distinguishable over time as a signature. A temperature (passively received microwave signal voltage) signature is created from the inception of a fire to when the fire reaches its maximum growth (and temperature) and then decays.

Improved devices for microwave detection include, for example, use of metal-semiconductor field effect transistors (MESFETs) for low noise block converters. Such microwave detection devices are described in several United States Patents, including U.S. Pat. No. 7,052,176 to Stephan et al.; U.S. Pat. No. 5,302,024 to Blum; U.S. Pat. No. 5,370,458 to Goff; and U.S. Pat. No. 6,767,129 to Lee et al. Devices for microwave detection are presently less expensive when detecting radiation in a range of microwave frequencies less than 25 GHz; however, improvements in microwave detection circuitry to practical application at higher frequencies up to the infrared region should not be taken to limit embodiments described herein.

Furthermore, the application of water quenching spray to interior window panes has proven an effective means of preventing and delaying the passage of fires from one compartment or other internal structure to another. Spray of exterior window panes may be designed to be directly related to the expected impact of a fuel fire explosion along a lateral distance, for example, 100 meters of a glass curtain window or, as suggested above, a rolling linear distance of glass curtain. Known sprinkler systems embedded in runway structures may be triggered by the same exterior passive microwave (and other different) detectors to automatically douse a tanker or aircraft or both when a fire is detected in a specific vicinity. Indeed, the location of the tanker or aircraft may be determined by its own heat signature detected by infrared or passive microwave or other means and distinguished from a refueling fire, especially aircraft departing or arriving at a concourse area. One embodiment may combine the advantageous feature of passive detection of a fire (no radio frequency generation is required) with other forms of fire, flame and smoke detection with active transmission such as ultraviolet, infrared, smoke and/or rate-of rise detection, particularly in the event of rapidly developing fires which need to be extinguished quickly without awaiting the arrival of firefighters.

The sprinkler is preferably connected to the structure's water supply, which may include a gate valve for automatically controlling the flow of water to an interior and an exterior sprinkler. In a deluge system, a main deluge valve actuates the flow of water and may expel gas (typically air or nitrogen), if used, from a predefined sprinkler system, for example, comprising thirty sprinklers for a 100 meter length window portion. Each sprinkler receives equivalent water supply in a deluge system. A deluge valve preferably includes both mechanical and electrical controls and may service a plurality of sprinklers from a central source. An array of exterior mounted passive microwave heat detectors may be arranged by zones, controlling the activation of the deluge valves serving logical sections, such as gate sections, of the passenger terminal where aircraft is parked and refueled. Similarly, the deluge valves may be actuated to protect internal zones of a terminal in the instance of internal or external fire detection or actuation of a fire alarm to protect the inside glass structures along a similar pre-defined or floating length.

A valve may be located at any point between a water line and an external or internal sprinkler system on a per sprinkler pair (if an interior window sprinkler is provided) basis and actuated to gate water to a zone threatened by fire as a protector or to suppress a fire that is burning in the zone. Such a valve is preferably installed adjacent to the structure's exterior. Firefighters and other individuals with access to the fire detection/protection/suppression system may manually actuate a deluge valve by throwing an alarm switch or the system may be automatically actuated upon fire event detection and discrimination. The deluge valve may be a centrally located valve providing, for example water (and gas expulsion if gas is used) along the piping system to the valves. Breather valves may be used in the piping or a tank supply system to equalize pressure.

In a first embodiment, the sprinkler may be a window quenching sprinkler that is adapted to saturate a portion of an exposed window (which may be a large window curtain or wall separating the interior and exterior of a terminal) when an interior or exterior fire suppression system for an interior or exterior zone is activated. The window sprinkler may be installed within a facade that aesthetically matches elements typically found on the window. For example, the window sprinkler may be a fan shaped quenching sprinkler nozzle that is mounted in the upper window frame and unnoticed until activated to spray water onto a portion of the window. This arrangement also allows for the routine cleaning of exterior windows without fears of damaging the sprinkler system. In times of temperature extremes and to promote fire retardant properties, water may be mixed with foam or anti-freeze or both.

A passive microwave receiver thermal event detection system may be retrofitted into an existing deluge sprinkler system such as that depicted in FIG. 1 with modification as necessary to provide passive receiver oversight of a gate refueling operation, for example, located on the roof edge of a terminal or gate structure. The rate-of-rise detectors may be utilized and further enhanced with infrared or other flame imaging of the refueling area and/or smoke detection as is suggested by the prior art.

In a second embodiment, the sprinkler is mounted above the exterior exposed surfaces of structural walls adjacent to emergency power generators which are typically operated by nearby storage of liquid or gaseous fuels. Such structural walls are open to the air at the top and so a directional passive microwave receiver may be mounted above so as to receive signals radiated by the generator and detect heat in any adjacent fuel storage tanks for fueling the emergency power generator. The breaching or malfunctioning of an emergency generator or its fuel supply may not impact upon the passenger corridor or other sections of the aircraft terminal when protected by a sprinkler controlled by remote actuation of a deluge valve and individual solenoid valves used to control water dispersal to particular sprinklers at generator or related fuel storage sites.

In many embodiments, one or more exterior arrays of directional passive microwave thermal detectors are interfaced with an electronic control panel including an intelligent processor for activating and deactivating one or more deluge and solenoid sprinkler systems electronically. An airport model may be preserved in memory associated with the processor including directional antenna beam coordinates and unique identification data and expected ambient readings for each directional array, for example, similar to the Miami airport model and using a fire dynamics simulator algorithm. The fire dynamics algorithm may further incorporate wind and wind velocity data input and weather data captured in real time for thermal event modeling. Fire and temperature signatures from actual detected events are compared with known previously stored signatures, and a decision may be automatically made, supplemented by passive microwave reception over time from the fire event, to operate either an internal or external sprinkler system or both and to distinguish particular fires and their suppression methods automatically or distinguish an event from a predictable false alarm.

In all of the embodiments, one or more automatic valves is preferably connected to an electronic control panel or processor for selectively activating and deactivating components of the fire suppression system electronically in response to true fire event detection. The electronic control panel may be a dedicated control panel used only for the exterior fire suppression system or may be connected to internal or other external systems in the structure or outside the structure, such as an interior fire suppression system, a roof protection system, an airport terminal tarmac protection system (such as a curtain system or a directed nozzle system), a security system or another computer network. In a preferred embodiment, the electronic control panel provides for remote activation of the fire detection, protection and suppression system through a monitoring service, telephone, remote control, computer network or other instrumentality. Heat sensors, flame detectors, smoke detectors or other sensing devices as well as directional passive microwave sensors may be connected to the electronic control panel to activate the fire suppression system automatically.

The extinguishing system may also include a flow switch, a breather valve and a mixing valve. The flow switch may be adapted to detect the flow of water through the plumbing system and instruct the electronic control panel to sound an audible alarm to warn occupants of an impending fire by means of the detection of water flow in a feeder pipe to a sprinkler, for example, an interior sprinkler. The flow switch and electronic control panel may also be adapted to provide the user with notification of a liquid or air/nitrogen leak in the lire suppression system by comparing expected flow rate with actual flow rate, a larger value than expected indicating a leak. One or more breather valves may be installed to relieve unwanted over-pressure or under pressure in a system, and may be used to drain residual water or air/nitrogen from the sprinkler system when the system is active/inactive and before/after restoration of air or nitrogen into the dry piping of a deluge sprinkler system. A mixing valve may be installed to add a mixing agent to the water for better fire suppression qualities, for example, foam, and/or anti-freeze for pipe/sprinkler/window surface anti-freezing properties. For example, the fire suppression system may be adapted to use various types of firefighting foam introduced into the water feeding localized arrays of quenching nozzles or protective coating sprinklers (for glass structures).

In a simplified embodiment, a sprinkler, a directional passive microwave receiver and a controller may be housed together in a system that may protect a space protected by the reception of the receiver which is preferably coincident with the fire retardant protection zone protected by the sprinkler. Such a simplified embodiment may be supplemented by adding other forms of flame, heat and smoke detection for the controller to make a fire event decision to actuate the sprinkler. Moreover, as will be discussed herein, the directional microwave receiver may be one of many dispersed at different locations through a facility to be protected and may even be used to predict and report dangerous situations such as electrical hazards in walls or aircraft collisions as the system becomes more complex, for example, by comparison with event signatures at passive microwave frequencies over time for various known, non-hazardous and predictable events versus hazardous modeled events.

These and other enhancements will become apparent from the drawings and following detailed discussion thereof.

BRIEF DESCRIPTION OF THE DRAWINGS

FIG. 4A is a block diagram of an integrated passive fire detection and suppression system according to one or more aspects described herein while

FIG. 6A is a block diagram of an exemplary array of microwave receivers and antennas placed in an out-of-doors space proximate a glass curtain to be protected in accordance with one or more aspects described herein.

DETAILED DESCRIPTION

Now a preferred embodiment of a system and method for protecting a structure from exterior fire threats will be discussed with reference to FIGS. 1-11. As discussed in the Summary, the aspects summarized above can be embodied in various forms. The following description shows, by way of illustration and description, combinations and configurations of passive microwave receivers and sprinkler systems in which the aspects can be practiced. It is understood that the described aspects and/or embodiments are merely examples. It is also understood that one skilled in the art may utilize other aspects and/or embodiments or make structural and functional modifications without departing from the scope of the present disclosure which particularly refers to an airport terminal environment but may be applied to any structure subject to an exterior fire event having a glass curtain structure such as a hotel entrance structure.

Figure 1:
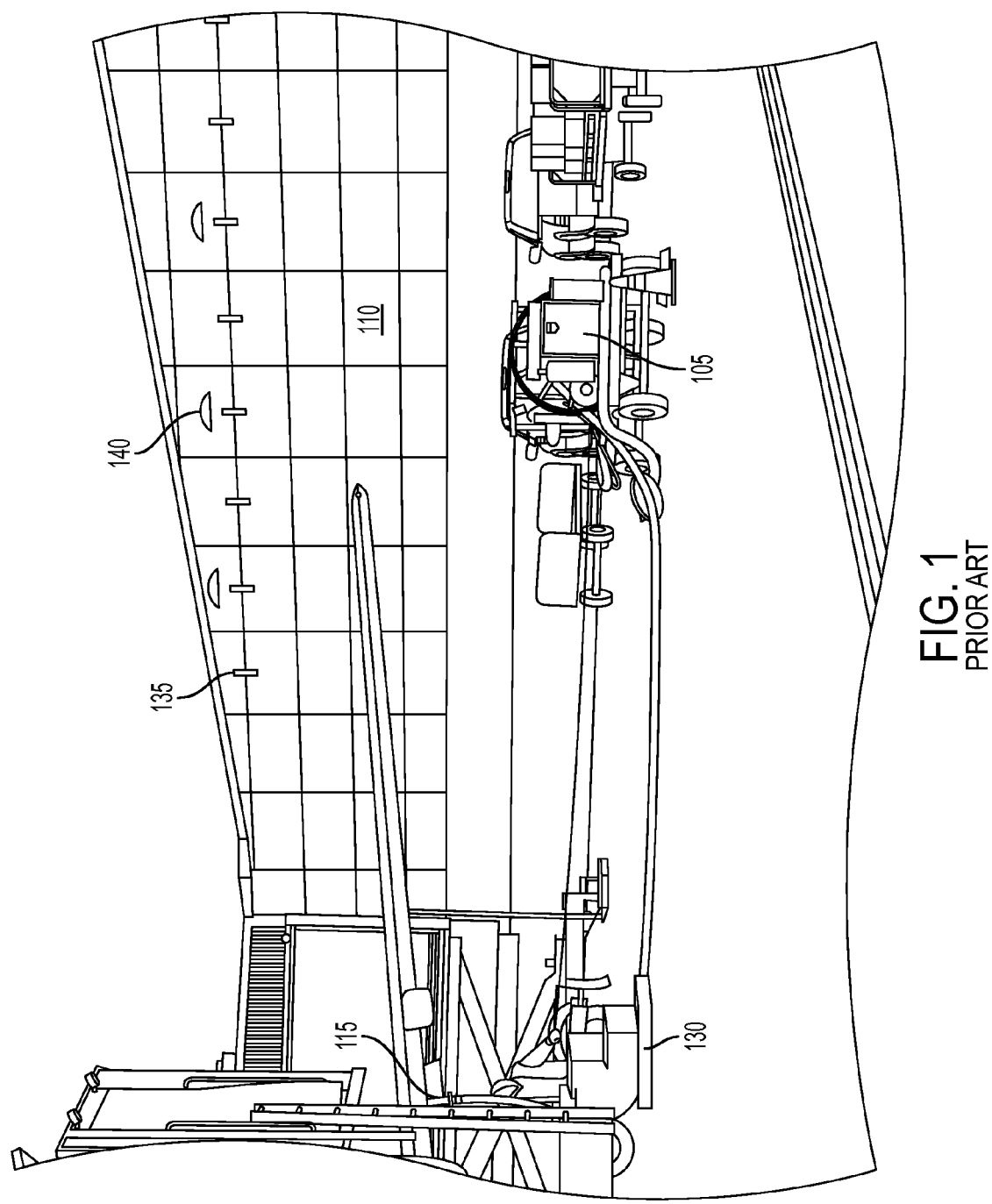
FIG. 1 is a drawing prepared from a photograph of a pump cart refueling operation at Baltimore Washington International—Marshall Airport also showing an exterior sprinkler system 135 for exterior sides of windows 110 and rate-of-rise detectors 140 for detecting temperature increase as heated air rises upon reaching the window surface to the detectors and a measured rapid temperature increase triggers localized exterior deluge sprinkler system 135 actuation.
Figure 2A:
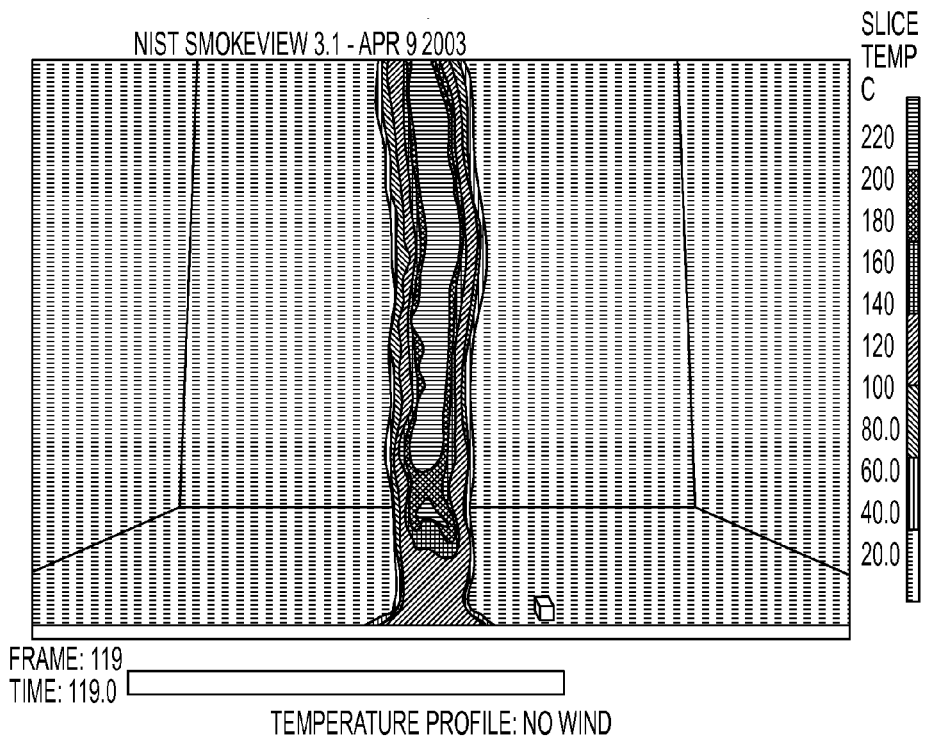
FIG. 2A shows the results of a fire dynamics simulator for a pool of airplane fuel with no wind and FIG. 2B provides a temperature profile with wind.
Figure 2B:
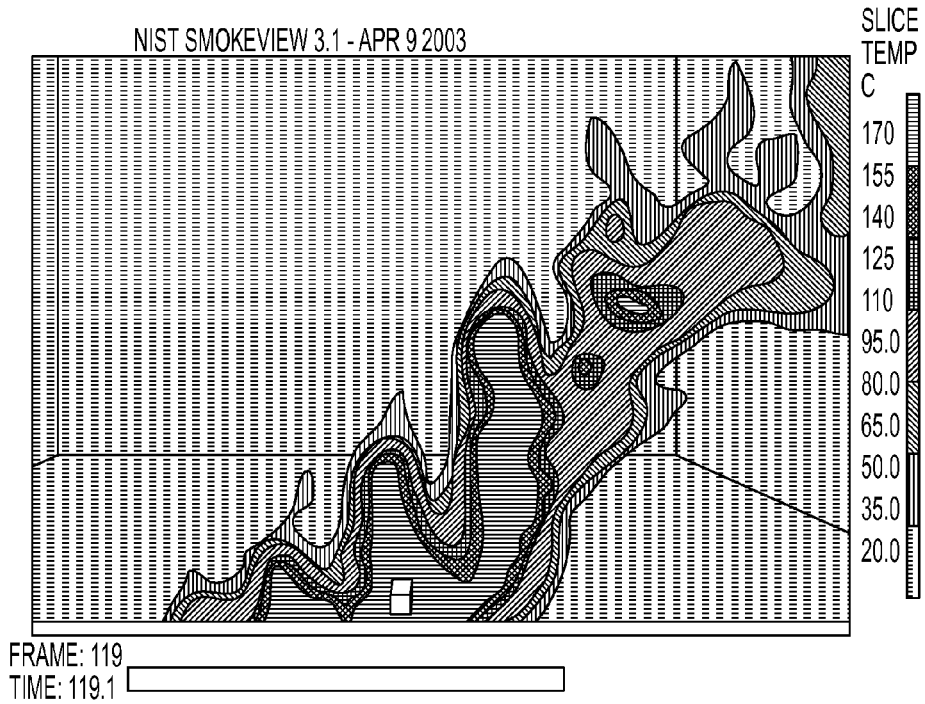
Figure 3:
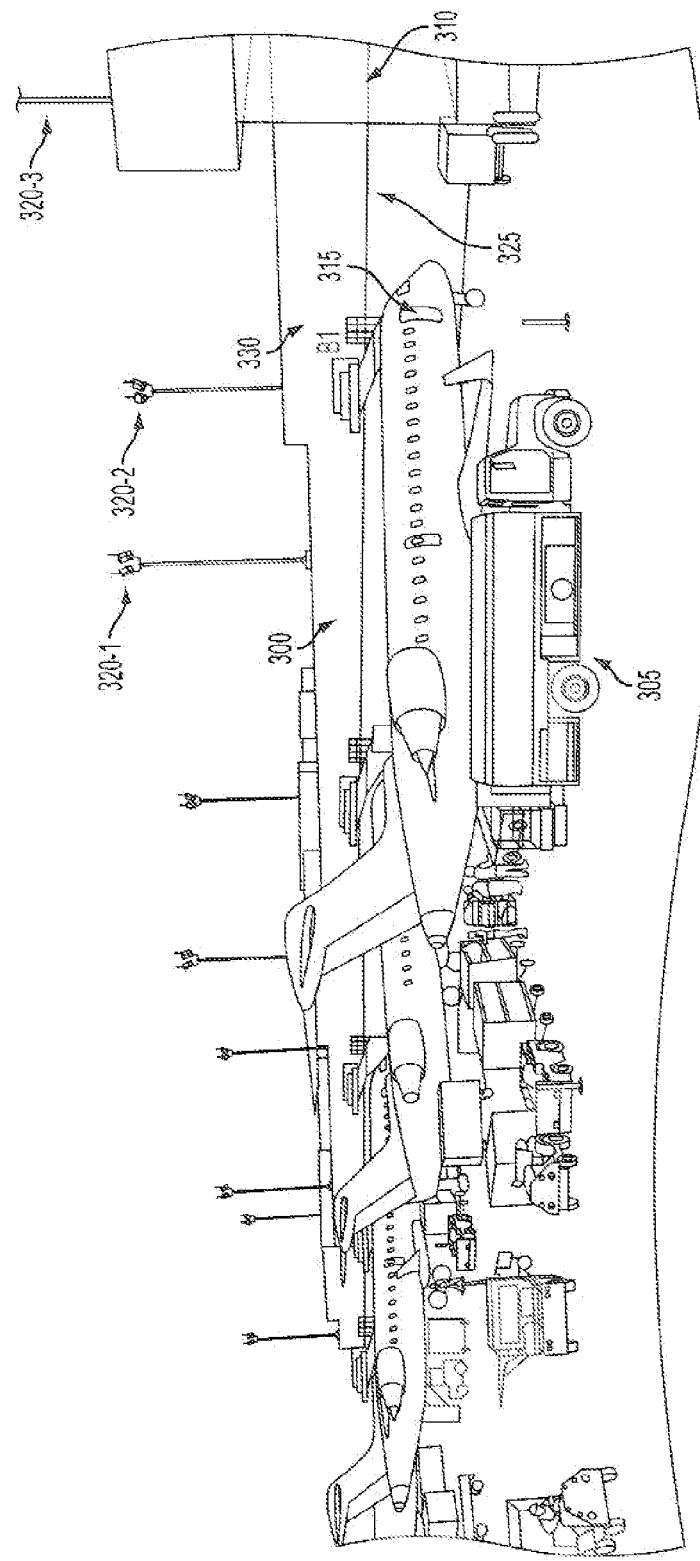
FIG. 3 is a drawing prepared from a photograph of a typical airport terminal in which the present system and method for protecting a structure from exterior fire threats may be implemented (in addition to that of FIG. 1), the depicted airport terminal, for example, having a glass curtain structure to be protected from fire within range of an aircraft refueling operation utilizing a tanker truck.

Referring now to FIG. 3, there is shown a typical airport terminal 300 with an ongoing refueling operation which is exemplary of a tanker 305 refueling operation as distinguished from the cart refueling operation of FIG. 1. Either airport of FIG. 1 or FIG. 3 may be enhanced to provide for directional passive microwave thermal event detection, protection and fire suppression as described herein. The refueling operation of FIG. 3 further typically involves an aircraft 315 to be refueled, typically in the vicinity of the wing of the aircraft 315. The aircraft 315 is parked at a gate B1 330 of a concourse 325. Tanker 305 may supply fuel (or may be a pumper cart for pumping fuel from an underground storage tank per FIG. 1). A lengthwise glass curtain structure 310 may be proximate to the refueling operation and require protection from a fire event that may be triggered by accidental or intentional means. Typically, passengers are precluded by airport regulation from entering the plane at gate 330, identified as gate B1 (of a B corridor or concourse 325) of the main terminal 300 during refueling. Typical lighting poles 320-1 to 320-3, as well as other convenient locations preferably above the refueling operation, may incorporate directional passive microwave receivers which may include directional array antennae, such as a directional mobile telephone antenna array, parabolic or horn antennae.

Figure 6B:
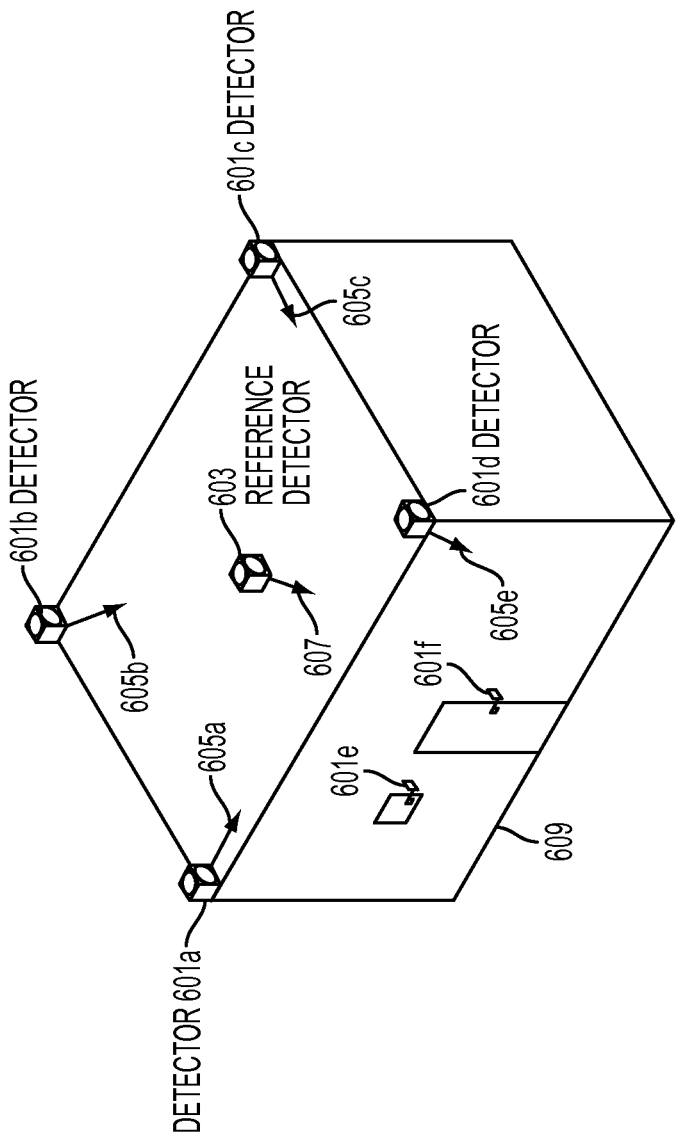
FIG. 6B is a block diagram of an exemplary array of microwave receivers for protecting a protected enclosed space.
Figure 7:
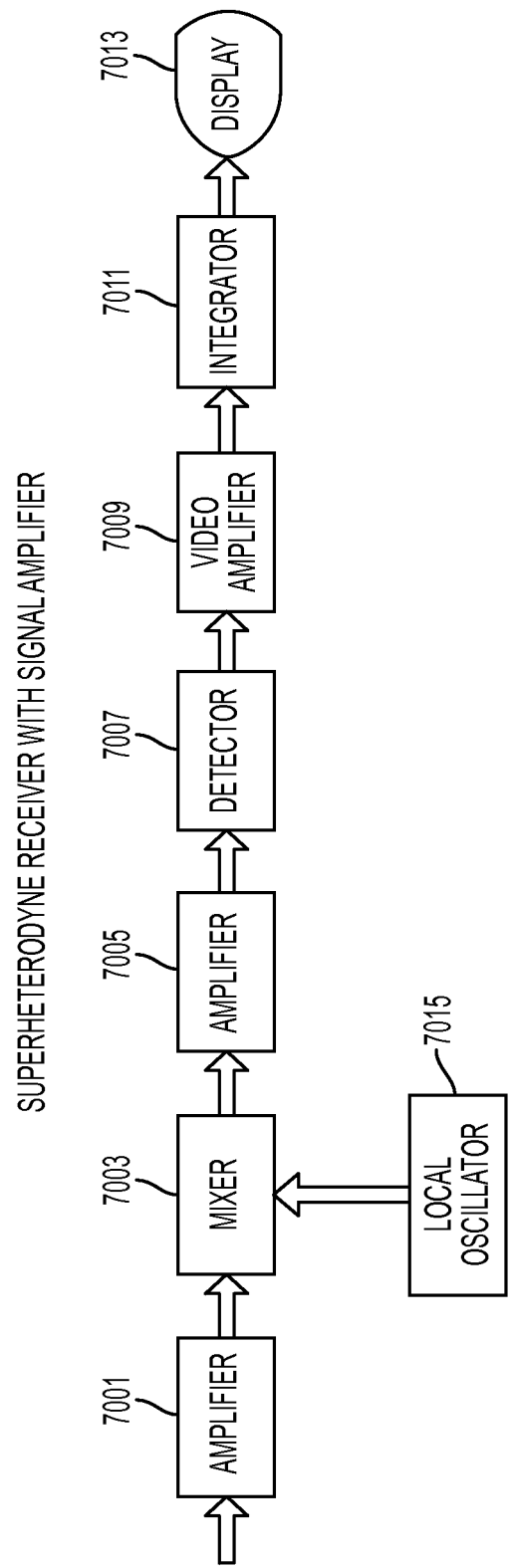
FIG. 7 depicts an exemplary embodiment of a superheterodyne receiver with signal display that can be used with a passive fire and intrusion detection system according to one or more aspects described herein.

An exemplary antenna array may be similar to that depicted in FIGS. 6 and 7 of U.S. Pat. No. 5,563,610 to Reudink. If more directionality is useful, a horn or parabolic array may be utilized at WARC protected frequencies to improve reception at low noise as may be further described in connection with FIGS. 7, 8 and 11. In the cellular telecommunications field, it is conventional to provide an antenna pole or mount on a building roof or other fixed structure having some height, for example, on a hotel or other building roof edge directed, if necessary, down toward ground. In this manner, a hotel, terminal (FIG. 1) or other structure may be equipped with at least one or a plurality of directional passive microwave antenna receivers. For example, FIG. 8 of U.S. Pat. No. 5,724,666 to Dent shows a plurality of antenna arrays 210, 212, each having respective amplifiers 216, wherein each array appears as a plurality of directional elements 224 which may be used for transmitting and receiving. Such an array or plurality of arrays may receive microwave frequencies via a first element provided with a low noise amplifier circuit such as, for example, a model RAS-1420HP LNA (low noise amplifier) providing 28 to 39 dB of gain in the 1.420 to 1.427 GHz, 27 MHz pass band of interest, available from www.radioastronomysupplies.com; (see FIG. 8). A second or the same antenna element of the same array may receive microwave frequencies in the 1.200-1.700 GHz band including the 1.420 to 1.427 GHZ band of interest of passive frequencies, for example, via a ZHL-1217HLN circuit having 30 dB of gain available from www.minicircuits.com. A third low noise amplifier choice can be an amplifier such as a ZGL-2700 MLNW, providing 25 dB of gain in the 2.2 to 2.7 GHz band including a 2.690 to 2.700 GHz providing a 10 MHz band of interest. This third LNA may have its own antenna element or share an antenna element of the same array. When overlapping active microwave band channels with passive bands are detected, any active channel frequencies broadcast in an area may be stored in memory and filtered out using band stop filters so that only the desired passive frequencies and inactive frequencies of the active bands are analyzed by the signal processor or, vice versa, a filter may be designed to pass the passive or inactive band of interest in a particular geographical area.

As described above, passive microwave reception and detection of a fire may be combined with other known fire detection methodology including infrared flame, thermal and smoke detection. However, passive microwave detection has an advantage of being able to receive microwave radiation generated by a fire event in the presence of smoke, flying debris and any obstacles to a line-of-sight directionality between passive receivers, for example, those mounted to towers 320-1 to 320-3 and the fire. Referring briefly to prior art FIG. 10, there is seen a graph of 500 to 2500 MHz microwave frequencies and their limited pass-through attenuation through different materials. This material may comprise obstacles to passive microwave directional reception or flying debris in the event of an explosion. Smoke, fire and the impact of these materials having known frequency attenuation characteristics may be stored in memory 4013 and weighted by a processor 4005 (FIG. 4A) in making an automatic sprinkler zone actuation decision.

Temperature signatures, as will be further described herein and defined above, may be obtained from predictable temperature events such as may be emitted by refueling truck 305 engine, refueling pumper cart 105 pump engine, other vehicle motor or pump motor operation, exhaust systems, aircraft engine actuation, running and turn-off, other vehicle operation such as luggage carts, hospitality trucks (FIG. 3), luggage load-unload, storage trailers/carts and other vehicles as typically are found on an airport tarmac and may be seen, for example, but not identified, in FIG. 1. These known temperature signatures may be stored in memory and compared with passive microwave detected signatures received from a calculable direction to discriminate a fuel pumper, an aircraft engine, an emergency power generator operation and a fuel fire so that a processor 4005 may discriminate and actuate a sprinkler system 4012 (for example, with at least predetermined exterior 4012a and interior 4012b zones as will be further described herein) accordingly for fire protection and/or suppression.

Figure 4A:
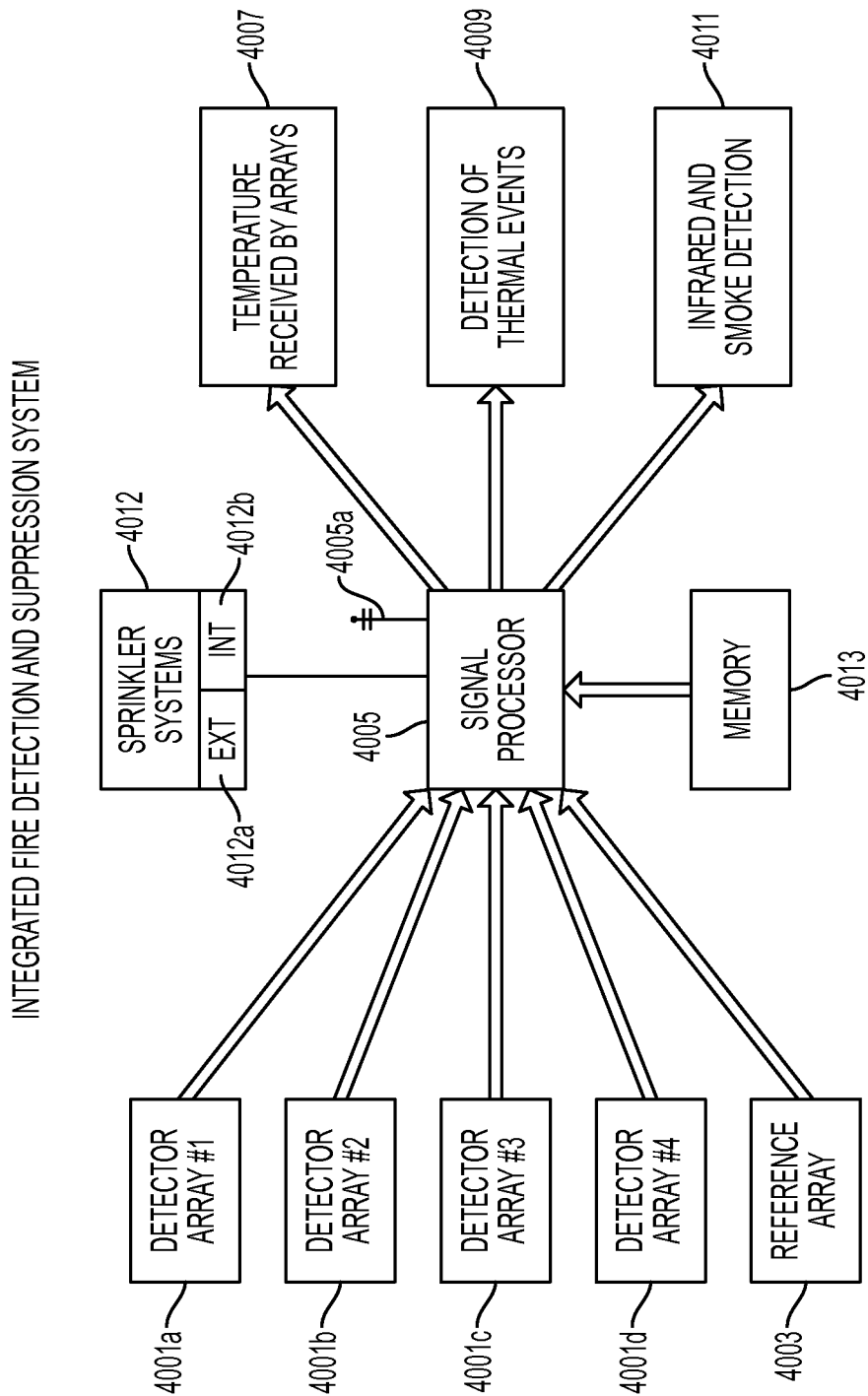

As shown in FIG. 4A, an integrated tire detection, protection and suppression System may include a plurality of detector arrays, such as detector arrays 4001a through 4001d in the exemplary application at an airport terminal shown in FIG. 1 or 3, plus reference array 4003 as necessary for providing a reference temperature level (such as the ground temperature). As discussed in more detail herein, detector arrays 4001a-4001d are configured to directionally detect radiation in one or more frequency bands in the microwave range, such as black body and thermal event radiation emanating from an automobile, a fuel spill, an aircraft and an airport employee (or intruder). Reference array 4003 is configured to detect radiation from a baseline radiation source such as the ground or a constant temperature hot source. Each detector in array 4001a-4001d can detect a unique temperature reading indicated by a relative voltage level output at a given microwave frequency or band of frequencies or plurality of channels and be otherwise indicative of temperature based on passively received microwave radiation. Each passive microwave detector may operate at a different wavelength or frequency or frequency range so as to capture black body or spectral line or frequency range emission in the microwave range, especially protected WARC channels. A signature for a given thermal event such as aircraft engine actuation may be collected over time for different engines of different aircraft expected at a gate. These expected signatures may be in turn stored in memory 4013 for comparison with a fuel spill fire signature (referring briefly to FIG. 15) or another aircraft signature or other event such as a pump or power generator operation signature and distinguished and/or identified as a false alarm or just for the purposes of comparison with what may be visually seen using a closed circuit television system. Memory 4013 may also store data for a given airport terminal or structure as a terminal and tarmac model with passive microwave receiver beam maps for determining a location of a thermal event via triangulation and comparison with the structure model/map. The result or output of thermal event detection 4009 may be the detection and identification of a severe thermal event such as a fuel spill fire at thermal event detection result 4009 from signal processor 4005. The event may be recognized by running a fire dynamics simulator model in comparison with live thermal event data collection from passive microwave and other thermal event detectors, input of real-time wind velocity and direction, weather and time-of day, date data. Each array can report unique temperature signature readings in the form of a voltage signal over time or a signature that may be sampled by analog to digital conversion as may be the received frequency value so sampled. These values are in turn output to a central processing unit comprising a signal processor 4005 and memory 4013 as shown in FIG. 4A for storage or comparison with other related signatures.

One exemplary digital signal processor for acting on digitally sampled frequency and level measurements is the Motorola DSP56800. Such a processor may provide a Doppler input to a more sophisticated data processing apparatus such as a personal or mainframe computer. The voltage signal level at a given frequency or frequency range over time reported by each directional passive microwave, flame (such as IR imaging), smoke, rate-of-rise (ror), fixed temperature or combination ror/fixed temperature detector or thermal imaging detector to signal processor 4005 can be directly or indirectly proportional to the temperature measured by the particular detector. Moreover, a spectral line indicator such as the presence of a given measurement of a given radical such as hydrogen or the hydroxyl radical may be an indicator of a very high temperature. As is well known, fuel is typically comprised of carbon and hydrogen and byproducts of burning include carbon dioxide and water. The presence of any of these spectral lines may be indicative of temperature in addition to the presence of a practically continuously increasing passive microwave signal level over time (the fire signature) in a given direction from the receiver. In an alternative embodiment as introduced above, any active microwave signals or channels used in a geographic region for, for example, telecommunications, satellite television, military or aircraft or ground vehicle communication purposes, may be detected, stored in memory 4013 as a signature, and subtracted as noise from any signals processed by signal processor 4005.

Signal processor 4005 can be in the same or a different location as the directional microwave receiver antenna arrays and other sensors, and the signals from each array or sensor to signal processor 4005 can be transmitted by wired or wireless means to the signal processor 4005. An antenna 4005a is intended to represent receipt of wireless signals, for example, received from a vehicle or human investigator as well as from fixed or stationary detectors 4001a to 4001d (which may be mounted to poles 320-1 to 320-3 of FIG. 3 or to the roof edge of FIG. 1) or on or across from a structure including a glass curtain as seen in FIG. 6A. Antenna 4005a may also receive a manual alarm signal of an airport employee preferably indicated by a unique digital signature to avoid false alarms and an indication as to what the employee is reporting, for example, an internal or an external fire and its location. If transmission by wireless transmission, each such wirelessly transmitted signal from a directional passive microwave detector can also include a data signal uniquely indicative of the location, direction and frequency and/or frequency range and bandwidth detected at a given directional passive microwave receiver or antenna element so that the signal can be appropriately identified and processed. For example, signal processor 4005 can be at a remote location such as a security station or other central monitoring station not affected by inclement environmental conditions such as those that may be present at a monitored airport facility, hotel or other structure having a glass curtain, or other site.

Once the detected passive microwave signals from detector arrays 4001a-4001d and reference array 4003 are processed, for example, according to thermal event modeling and signature comparison as described above, the results can be provided in a number of ways. According to aspects described herein and as discussed below, the received directional microwave radiation can be converted into a signal wherein a voltage signal level and direction can be determined as a result of the differences in radiation detected compared with a norm over time. In some embodiments, the radiation detected is compared to baseline radiation from, for example, a floor of a room, the ground, or the foliage of large trees, normal aircraft maintenance and ground operations, and a voltage difference over time (signature) can be used to detect the presence of an automobile, other vehicle, aircraft, or an airport employee (or intruder). For example, a large voltage signal gaining over time in a direction of where an aircraft may be more likely than not be present may be indicative of an aircraft engine actuation, its value being an indication of its high temperature and its width in time an indication of its temperature increase over time as a unique signature. In other embodiments, the baseline radiation can be from an outdoor temperature, and detected radiation can be used to determine the presence or absence of a human or other living being in a space via black body radiation principles, thus, for example, aiding first responders in identifying the presence—or just as importantly, the absence—of persons at a fire event in need of rescue. Moreover, the number of airport personnel may be pre-determined and an intruder identified in an area when an expected employee count exceeds a norm.

In some embodiments, the difference in microwave frequencies detected by directional detector arrays 4001a-4001d and reference array 4003 can be output as a temperature detected by the detector arrays, either as an absolute temperature or as a temperature difference as well as by detected direction to the received signal and its velocity and direction over time so that a thermal event, such as a passing vehicle or aircraft can be detected and discounted as being a fuel fire explosion event. Moreover, as introduced above, airport employees have predictable black body emission. Such employees in the scene of a fire or in proximity of a fire or other dangerous event may be detected and potentially rescued by directional location from passive microwave reception. Alternatively, the difference in detected frequencies from predicted values can be output as a detection of an intruder compared with the detection of, for example, an expected count of airport employees according to principles of parent U.S. Pat. No. 7,724,134, and an appropriate alarm can be sounded for security police assistance.

Moreover, a visual display (not shown) may be associated with processor 4005 to provide a visual indication of a black body (fuel fire, automobile, aircraft or employee presence) as seen (via passive microwave) and enhanced via infrared imaging detection and vision or smoke detection 4011 or the output may take the form of a spectral line or frequency display of emission level versus frequency over time. Exterior smoke detection may be influenced by wind velocity and direction of wind and these, normally measured at an airport, may be input to processor 4005 to qualify a smoke detector measurement of smoke at a particular exterior smoke detector location and enhance computer fire dynamics simulator modeling of a thermal event. For example, a smoke detector upstream from a terminal gate may detect smoke from a downstream gate and the smoke detector at the downstream gate fail to detect smoke and so impact a decision regarding a fire event for a given gate depending on wind velocity and direction. Exterior temperature and the presence of sun energy may influence a thermal event decision and such factors as absorbed sun energy temperature in a given body and cloud cover may be further inputs to processor 4005 decision-making.

Figure 12:
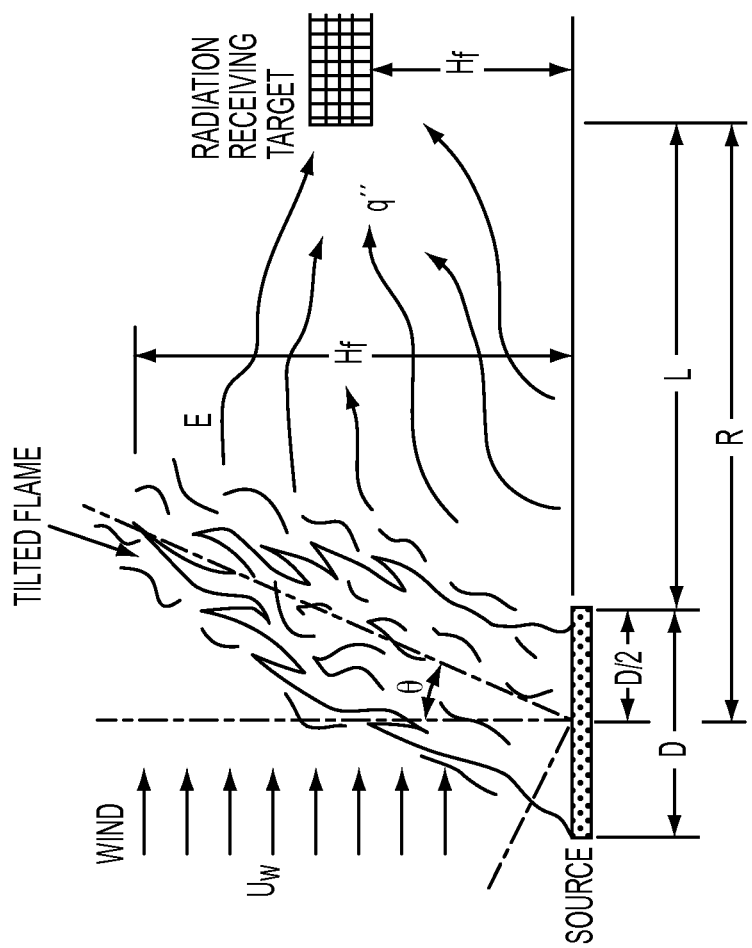
FIG. 12 provides a diagram of a fuel spill fire model showing the several parameters of such a fire.

Now, referring briefly to FIG. 12, there will be discussed the results of modeling a fuel spill fire at Source having diameter D, blown by Wind having velocity $u_W$. The direction of Wind is indicated by arrows such that Tilted Solid Flame Model of height Hf is blown at angle θ such that energy E is directed toward radiation Receiving Target at height $H_f$. The Target is at distance R from the center of the fuel spill or length L from the outer circumference. Flux q" is also transmitted toward Target.

For an example, at an ambient temperature of 77 degrees F., the fire from a 1000 square foot spill of JP-5 aviation fuel at an airplane parked near a passenger corridor and tilted by a 10 mile per hour (879.8 feet per minute) wind towards the corridor would expose a receiving target such as a glass window 50 feet away a radiative heat flux from the fire of approximately 9.63 kW/m$^2$. (Reference: Iqbal and Salley, *Fire Dynamic Tools (FDT's) Quantitative Fire Hazard Analysis Methods for the U.S. Nuclear Regulatory Commission Fire Protection Inspection Program (NUREG-1805, Final Report)*, see Chapter 5, December, 2004.

For example, a significant hazard of an external fire to airport glass-lined corridor is the compromising of the window by cracking and eventual fallout through exposure to high radiant heat fluxes above this calculated 9.63 kW/m$^2$. This calculated fire event would expose human occupants within the terminal to untenable conditions and potentially cause the fire to spread and consume the structure. Research by Cohen and Wilson, "Current Results from Structure Ignition Assessment Model (SIAM) Research," *Fire Management in the Wildland/Urban Interface: Sharing Solutions*, Alberta, Canada (October, 1994) concerned radiant exposure from external wildland fires exposing small and large single- and double-glazed glass panes, including tempered glass. They repeated for small windows, starting at 9.3 kW/m$^2$, all windows cracked. In experiments with large-size double-glazed windows (non-tempered), they found that fluxes between 20 and 30 kW/m$^2$ were required to cause fall-out in both panes. In summary, wind direction and velocity are significant variables for inclusion in prediction of fire events and, in at least one embodiment, are input to signal processor 4005 in real time.

The following is a table demonstrating the differences between types of fire detectors utilized in airport fire safety programs, influence in the face of wind and potential false alarms:

As discussed in some detail herein, a range of different apparatus including but not limited to rate-of-rise, thermal, combination ror/thermal, u/v and or infra-red imaging, smoke and passive microwave can be beneficial when utilized for fire detection, protection and suppression, for example, in an out-of-doors environment. Short wave and ultraviolet sensing or passive microwave sensing may exhibit false alarms due to lightning. However, with weather, direction and the like being an input to processor 4005 and through the use of correlation with known lightning signatures over time, a false alarm may be qualified, for example, with directional passive microwave. As necessary, emphasis may be placed, for example, on visual flame detection or rate of rise/temperature detection to alleviate concern or to discount a potentially false alarm.

In other embodiments, the central processor 4005 can be connected to a remote or local display so that a visual display of an automobile, aircraft or human intrusion can be shown, either alone or, for example, combined with an infrared or visible light display captured by an appropriate camera for storage or retrieval from memory 4013. Such a display output from a passive microwave receiver can show the location of both visible and less visible automobiles, aircraft (even overhead aircraft) and intruders, for example, during a fog, rain, snow or other inclement weather condition. In addition, via intrusion and speed detection aspects, such a fire detection and suppression system can show the location of any persons or animals within or outside a building, automobiles on a highway or in a parking lot trying to enter or leave a building or other protected space, thus enabling security personnel to better focus their efforts to deterring an animal or human intruder without risking their lives in unnecessary apprehension attempts.

As noted above and as described in more detail herein, aspects of a directional passive microwave fire and intrusion detection and suppression method and apparatus can incorporate the use of one or more passive microwave-based sensors including one or more directional antennas configured to

| Detector Type | Wind toward Detector | Wind Away from Detector | Smoke Obscuration | False Alarms |
| --- | --- | --- | --- | --- |
| Microwave (Passive Device) | Will Detect Fire | Will Detect Fire | Will Detect Fire | False alarm from lightning, for example, may be distinguished |
| Rate-of-Rise, Heat | Will Detect Fire | Delay or No Detection | Will Detect Fire | |
| Fixed Temperature, Heat | Will Detect Fire | Delay or No Detection | Will Detect Fire | |
| Ultra-Violet, Short Wave | Will Detect Fire | Will Detect Fire | Delay or No Detection | False Alarms from Lightning |
| Infra-Red | Will Detect Fire | Will Detect Fire | Will Detect Fire | False Alarms from Black Body Radiation- e.g. Jet Exhaust; sun may be distinguished by filtering and known imaged fires by image analysis |
| Smoke | Will Detect Fire | Will Not Detect Fire | Will Detect Fire, but not direction in a wind | May False Alarm from Jet Engine Exhaust Emissions, local power generators, service vehicles, and similar smoke or exhaust exposures |
| Visual Flame Detection | Will Detect Fire | Will Detect Fire | Delay or No Detection - responds to "bright" fires only | Sunlight and image analysis prevents some false alarms | receive microwave radiation in the microwave frequency range, including any of the several frequency ranges described above that are protected for passive microwave detection in the field of radio astronomy with detection occurring over the protected band or those bands such as above 275 GHz, not typically used for any radio communication or transmission. The present system may be used in conjunction with other known systems such as ionization, radiation (for example, in the visible or infrared or ultraviolet spectrum), ultrasonic and other known active radiation detectors. As such, with greater information about a given event, potentially false alarms may be automatically investigated thoroughly and eliminated as truly false. More importantly, different signatures at different electromagnetic or sonic (ultrasonic) frequency ranges and directions may be stored and compared with events so as to better distinguish among rising temperature and other thermal events.

In accordance with one or more aspects described herein, a passive microwave integrated fire detection and suppression system and method can utilize the directional detection of microwave radiation on one or more of these protected frequencies by various combinations of microwave receivers and antenna arrays. An antenna array in accordance with one or more aspects herein can be designed to detect a subset of the microwave radiation band of from, for example, a 27 MHz-wide band of 1.400 to 1.427 GHz (for hydrogen line spectral emission at 21 cm) and a 20 MHz wide band at a center frequency of 10.690 GHz to show an increasing Hack body or spectral radiation emission with increasing frequency (decreasing wavelength) over time (signature). The principle may be extended to all frequencies across the microwave spectrum and into the infrared spectrums for black body or spectral radiation in comparison with expected event signatures stored in memory 4013. In addition, in accordance with aspects herein, this bandwidth can be split into many different internationally protected bands of varying bandwidth according to WARC-79 radio astronomy allocations, with each of a plurality of receivers receiving a subset of the emitted black body and spectral passive microwave radiation. As other bands may be reserved in the future for passive detection, such frequencies and bands may also come within the scope of an embodiment. In addition, other bands in the microwave regions may be utilized, including bands which overlap internationally protected bands and known microwave radio frequencies in a given area subtracted or filtered from received results in a manner similar known from, for example, echo cancellation techniques from the telecommunications arts.

Due to the mass production of commercial microwave antennas and associated electronics, the cost of passive microwave fire and intrusion detection is relatively low when compared to other technologies, such as infra-red thermal imaging. Low noise amplifier circuitry is now conventional and provides excellent low noise performance and permits discrimination from noise using antennae that are not high gain or large in size, such as small parabolic, linear array or horn antennae. Even though infrared thermal imaging may be expensive to implement, the infrared imaging may provide useful input to data processor 4005. A resultant infrared thermal image may show hot spots in an image of an airplane refueling operation enhanced by a visible spectrum photographic image so that, for example, thermal events at an aircraft engine may be detected and discriminated. If, for example, an aircraft engine is running during airplane refueling, a violation of airport policy may be detected and an alarm sounded to a pilot or to airport refueling personnel.

Directional antenna arrays 4001a to 4001d in accordance with aspects herein can include flat arrays, parabolic arrays or horn type arrays and can include one or more point antennae as well as directional cellular telecommunication pole antenna arrays of antenna elements. The antennae utilized should not be considered limiting to the scope of the present invention. A desirable characteristic, however, is data indicating a direction of signal reception so that, for example, a particular thermal event may be located, for example, by triangulation from two such spaced antennae from the direction data received b each of two antennae spaced from one another. A dish or parabolic antenna, for example, antenna 810 of FIG. 8 may be designed such that an expected fuel fire may fill approximately 3 dB beam width of the antenna.

Once signal processor 4005 distinguishes a detection of a significant fire event such as a fuel fire explosion at box 4009, an external sprinkler system 4012a may be actuated and produce a thin film of for example, water or other cooling liquid or fire retardant liquid to be laid on a glass curtain 110 (FIG. 1) or 310 (FIG. 3) from the top of the glass curtain as per FIG. 1, 3 or 5. A gate valve 510 may be used to trigger external sprinklers at particular locations in range of the fire according to an expected and potentially pre-modeled length of window curtain such as 100 meters. A particular deluge valve controlling a plurality of gate valves for an either interior or exterior zone of protection and fire suppression may be triggered by radio or wired signals identifying the particular deluge valve adjacent to a fire location by processor 4005 noting the location of one or more reporting directional detectors 4001a-4001d. Subsequently, in the event a fire event or significant high temperature or smoke are detected inside a terminal such as terminal 300, then internal sprinkler system 4012b may be actuated in a localized setting where the high temperatures or smoke inside the terminal 301) are detected by conventional means such as smoke detectors or rate-of-rise/thermal temperature sensing.

Figure 4B:
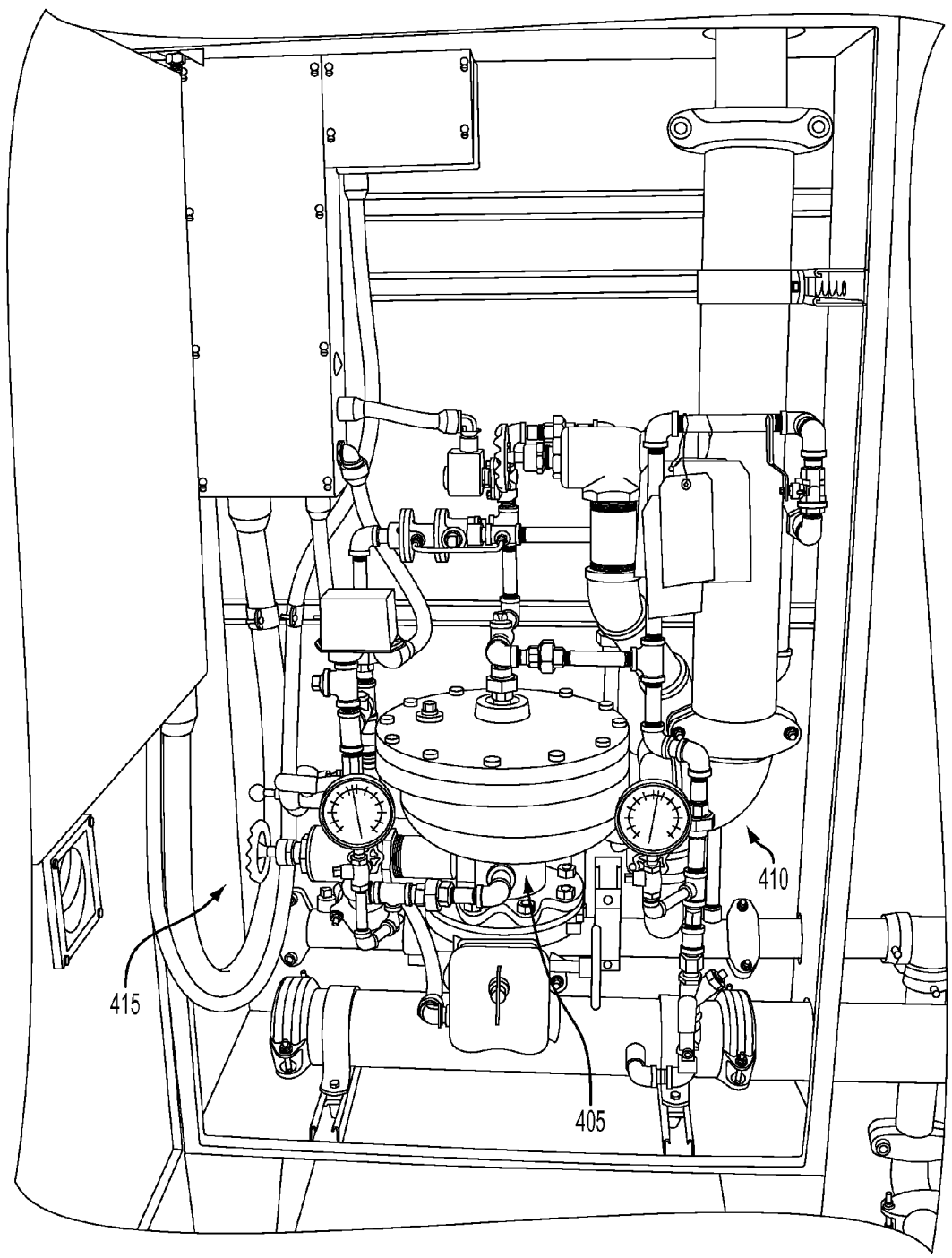
FIG. 4B is a drawing made of a photograph of a deluge sprinkler system having first and second interior/exterior zones.
Figure 5A:
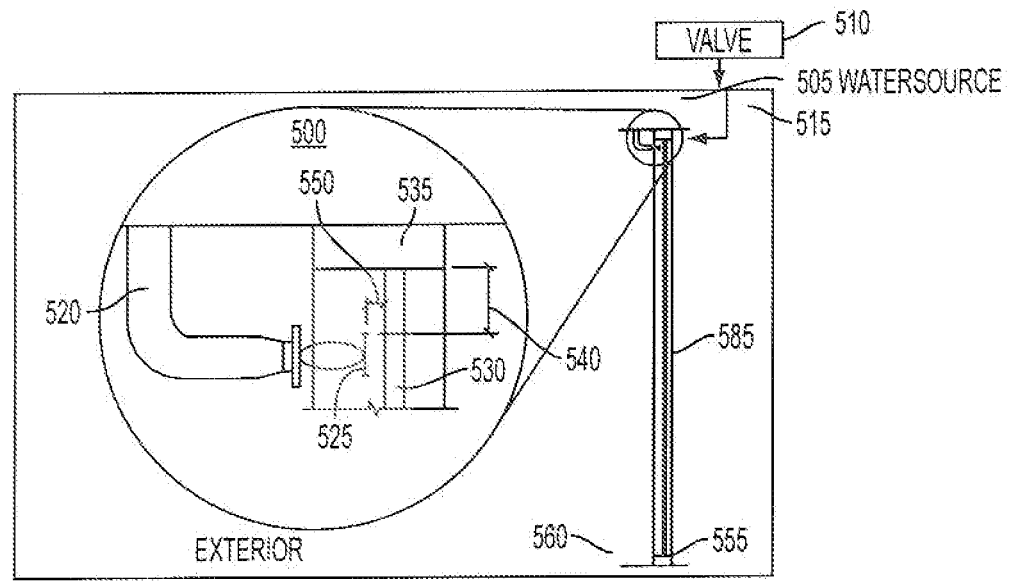
FIG. 5A is a side view picture block diagram of a typical sprinkler system arrangement in relation to an exterior of a glass curtain wall to be protected where both interior and exterior window panes may be protected by an interior/exterior sprinkler system equipped with a gate valve 510 which may operate to gate water or other fire retardant to one side, the other or both sides of the glass.
Figure 5B:
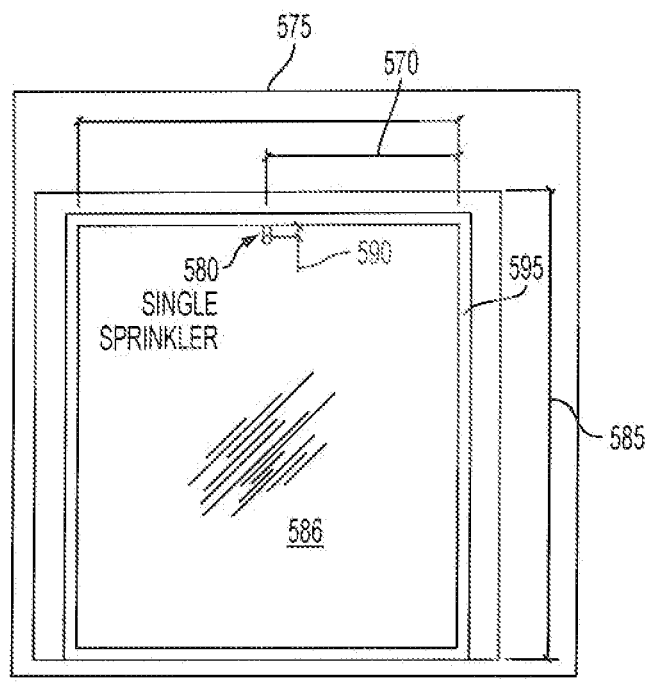
FIG. 5B is a front exterior view showing a relationship between a sprinkler and a width of a glass structure to be protected by a sprinkler.

Referring now to FIG. 4B, there is shown a drawing made of a photograph of a deluge sprinkler system having first and second interior/exterior zones per sprinkler systems 4012 of FIG. 4A. The drawing shows a deluge valve 405 and a first sprinkler zone 410 having its own pressure valve whereby a change in pressure may indicate a leak in the depicted piping system as it provides a water source 505 gated by gate valve 510 to a sprinkler head for an exterior pane 586 (FIGS. 5A and 5B). A second sprinkler zone 415 having its own pressure valve may represent another second, interior/exterior zone. More zones may be controlled by the same deluge valve 405, especially if proximate to one another such as interior glass, interior and exterior glass, same gate zones.

Referring now to FIG. 5, there is shown a glass curtain 586 in side view, FIG. 5A, and front view, FIG. 5B. FIG. 5A element 500 provides detail of a given sprinkler comprising, for example, flexible pipe 520; deflector 525, upper transom 535. An exemplary distance 540 between the top of deflector 525 and a horizontal wall of transom 535 is 50 mm. An exemplary distance 550 between deflector 425 and a glass curtain 530 is 13 mm. An exemplary height 585 associated with a glass curtain 586 may be a height between a floor and a ceiling. The glass curtain is typically supported by a transom 555 which is a width-wise member for supporting the glass curtain 586. Element 560 may represent the ground but, typically, as seen in FIG. 35B, a glass curtain may comprise many double panes between floor and ceiling. At the sides of a glass curtain 586 are mullions 595 (FIG. 5B) which are vertical members which have a depth and separate one adjacent pane from the next adjacent pane of glass. Referring to FIG. 5A, a spray sprinkler 580 is shown deployed from a ceiling and fed by for example, a flexible supply 520. The sprinkler may be provided on each side of, for example, a double pane glass curtain where each pane is preferably at least 6 min thickness. Experimental results have confirmed that a double pane window at 6 mm thickness may receive a radiated temperature of 750° C. without any glazing falling. Another test noted that a pane deteriorated at 350° C. gas temperature. A further test suggests that a heat flux on the order of 70 to 110 kW m$^{-2}$ was necessary for significant glass curtain deterioration. Moreover, one pane will preserve the second pane from reaching a high temperature until the first pane deteriorates. Consequently, per FIG. 5A, an exterior spray may be produced by a water supply 520 impinging on a deflector 525 set approximately 13 mm denoted as exemplary distance 550 from the glass curtain 530 where the deflector is mounted 50 mm below the transom piece 535 indicated as exemplary distance 540. The interior spray may be delayed in operation until the exterior pane deteriorates. Per FIG. 38, a glass curtain 586 may be protected by a single sprinkler set 50 mm 590 below the upper transom to protect 1.5 meters represented by exemplary distance 570 to left and right of the sprinkler 580. Consequently, one sprinkler may protect a pane as wide as 3 meters 575 and two sprinklers a pane as wide as 6 meters. A 100 meter distance. 50 meters from either side of a refueling fire incident may be protected by a single deluge valve operating thirty gate valves spread over the 100 meter distance. A predetermined or rolling exterior zone, therefore, may comprise a linear length of between 30 and 100 meters and comprise between ten and thirty sprinklers.

FIG. 6A depicts an exemplary configuration of directional detector antenna arrays along an area or volume to be protected such as an airport tarmac, a road, sidewalk, border, walkway, canal, etc. In this embodiment, passive microwave detection in accordance with aspects herein can be particularly useful for fire event detection, since the presence of a fire developing in the area or volume can be almost instantaneously detected by the use of passive microwave detection of black body/spectral microwave emission from the fire, as distinguished from a non-fire event such as a vehicle passing, across a microwave spectrum and time with characteristic increasing emission with increasing frequency (decreasing wavelength) and over time as a fire event develops by a characteristic signature. Moreover, if combined with an airport map stored in memory 4013, this embodiment may protect from aircraft or other vehicle collisions or otherwise assist tower personnel, especially in bad weather such as fog and snow causing low visibility. As shown in FIG. 6A, two or more detector antenna arrays such as arrays 6001a and 6001b can be placed at spaced apart locations around the area or volume to be protected, for example, at opposite ends of a line demarcating a boundary between an airport section and a car rental terminal section or a vehicle parking area of an airport terminal. As with the detector arrays described above, directional detector arrays 6001a and 6001b can be configured to passively detect microwave radiation from, for example, directions 6005a and 6005b, at different microwave frequencies, or both frequencies or frequency ranges over time. Any received signals may be qualified as to antenna array, direction, amplitude, duration, location of the detector and the like so that, for example, aircraft may be located and indicated on an airport map for tower personnel. The microwave radiation so detected can be compared to baseline radiation detected by reference detector 6003 in direction 6007 and over time with airplane heat signatures to provide immediate indication of the presence of an aircraft at a particular location or a fire event in a protected area. Many airports may want to establish a boundary water curtain between, for example, a car rental area from an airport terminal area in the event of a severe fire or explosion detected at one or the other. The embodiment of FIG. 6 can thus be utilized to establish a water curtain at a boundary depending on the quality of a detected event. More particularly, it is suggested with reference to FIG. 6 to establish a plurality of passive microwave receivers to protect a glass frontal entrance to a hotel from the hotel and, if possible, across the street from the hotel, in the event of an exploding vehicle located near the entrance. As suggested above from airport modeling, a typical reactive time to a fire explosion may be short and on the order of less than 120 seconds. Consequently, passive microwave detection and decision making may be instantaneous for locating and detecting aircraft and fire events. The slower operation of the sprinkler system via a deluge valve may suggest that the deluge sprinkler system with gate valves may be designed to operate in 30 seconds or less to clear air or nitrogen from the pipes (if used) and provide water to selectively activated spray sprinklers according to sprinkler zones or to dispatch emergency personnel to a collision scene.

FIG. 6B depicts an exemplary array of antennas that can be used in an interior installation, for example, to protect an enclosed space. Spaces that can be protected by such a configuration include commercial and residential buildings, offices, warehouses, and other structures.

As shown in FIG. 6B, a plurality of directional detector antenna arrays 601a-601d can be placed at spaced-apart locations around a perimeter of an enclosure 609 where passive detectors 601a-d are mounted in or on a wall surface pointing inward and detectors 601e-f are protecting openings such as doors, gates, windows and the like. In an exemplary embodiment, each detector antenna array can be in the form of a cellular radio type pole array similar to those depicted in FIGS. 6 and 7 of U.S. Pat. No. 5,563,610 to Reudink. In one configuration, passive microwave detector antenna arrays 601 for detecting black body, radiant heat and spectral line emission can be placed outside the walls, i.e., so that they can be seen by persons within the room. These can monitor across the entire microwave spectrum from 0.5 to 1000 GHz, or, for example, 1 GHz to 50 GHz. Alternatively, as noted above, microwave radiation at, for example, 0.5 to 3 GHz can penetrate non-metallic walls (for example, drywall, brick, block or adobe, and therefore one or more of the detector antennas 601a to 601f can also can be placed within the walls. Placing the passive microwave detectors within the walls can be aesthetically desirable, but more significantly, can be advantageous in that an unwanted intrusion, temperature and speed detection system with detectors placed within the walls of an enclosure cannot be seen or tampered with by an intruder, thus providing additional protection. Moreover, the wall may provide some insulation value such that readings from such a detector may not be susceptible to high temperatures when compared to a detector mounted on the wall closer to a thermal event. A further embodiment may comprise both inside the wall and outside the wall passive microwave detectors. Also, when the structure is a hangar with a high ceiling, a set of detectors 601a to 601d may be located just under wing level and another set above wing level or in the ceiling to detect lire events and bodies in the hangar.

Also as shown in FIG. 6B, the plurality of detector antennas 601a-601f can be arranged to detect radiation from different directions 605a-605g. Each antenna array 601a-601f may have a primary directional lobe covering from a wall which it faces to a center of the room/hangar/structure. Two corners of a room may provide sufficient directionality to determine the precise location of an intruder or fire event in a room (or an aircraft on a runway, an automobile in a parking lot or another vehicle on a highway). Window or door detectors 601e, f may be directed across the opening for detection of fire cross-over or intrusion into the protected space within the depicted room. In addition, as discussed above, one of the antenna arrays may be configured to receive microwave radiation at one frequency band, for example, the 1.420 to 1.427 GHz 27 MHz pass band of interest for hydrogen line emission, or may be broken into several channels as will be discussed herein, while another of the arrays can be configured to receive microwave frequencies in the 1.200-1.900 GHz band including the 1.420 to 1.427 GHz band of interest and the several hydroxyl lines appearing between 1.612231 and 1.720530 GHz (and their Doppler effects). Reference detector 603 can be configured to detect radiation from a baseline reference source such as a wall, the ceiling (also serving as the floor for a room or structure located above) or the floor. The radiation detected at detector antennas 601*a*-601*d* can be compared with the baseline radiation detected by reference detector 603 from direction 607 and processed as discussed in more detail herein to provide detection of a fire event or intruder within the enclosure 609.

The output of the directional antenna arrays in a passive microwave aircraft, automobile, speed, temperature and intruder detection and fire suppression system, whether in any of the configurations discussed above or otherwise, can be fed to a superheterodyne receiver shown in FIG. 7. As shown in FIG. 7, a superheterodyne receiver with a signal amplifier can comprise an amplifier 7001, for example, a conventional low noise block amplifier or low noise amplifier possibly requiring a bandpass filter having superior noise performance, a mixer 7003, and a local oscillator 7015 for demodulating the received signal (up to 1000 GHz) to an intermediate frequency (IF) signal, for example, in the 100 MHz to 0.5 to 2.5 GHz range. The IF signal may then be amplified at amplifier 7005 and transmitted by wired or wireless means to a signal processor 4005 at a central site as shown in FIG. 4A for further processing and compared with stored data in memory 4013 for an identified site (protected area of an airport or hotel or the like) and with characteristic black body and microwave spectral emission characteristic signature data at given frequencies over a pre-determined band.

The signal processor 4005 shown in FIG. 4A at a central site may comprise elements 7007-7013 shown in FIG. 7 among other elements. At the central site, the received IF signal may be detected as a voltage and associated frequency or frequency range at detector 7007, provided to a video amplifier 7009 and integrator 7011 for integrating the baseband signal across the band of interest, and displayed at display 7013 or used for thermal event determination 4009 of FIG. 4A.

The output of the amplified signal, also referred to herein as a brightness temperature signal, may be interfaced to a laptop computer or smaller computer, via a digital signal processor such as a Motorola DSP 56800 discussed above, such as a personal hand-held or worn computer. In some embodiments, such a computer can include a display 7013 for displaying a voltage reading/time and frequency which is converted to a temperature and/or an average fire development reading for comparison with a predetermined temperature level such as 194° F. for fire suppression. Human expert intervention may be employed at processor 4005, but, improved speed of suppression may require automatic actuation and discrimination among thermal events by processor 4005 via pre-stored thermal event signatures and modeling where an authorized human intervener may preferably only veto a determined automatic decision to actuate a particular sprinkler system in a particular area.

Figure 8:
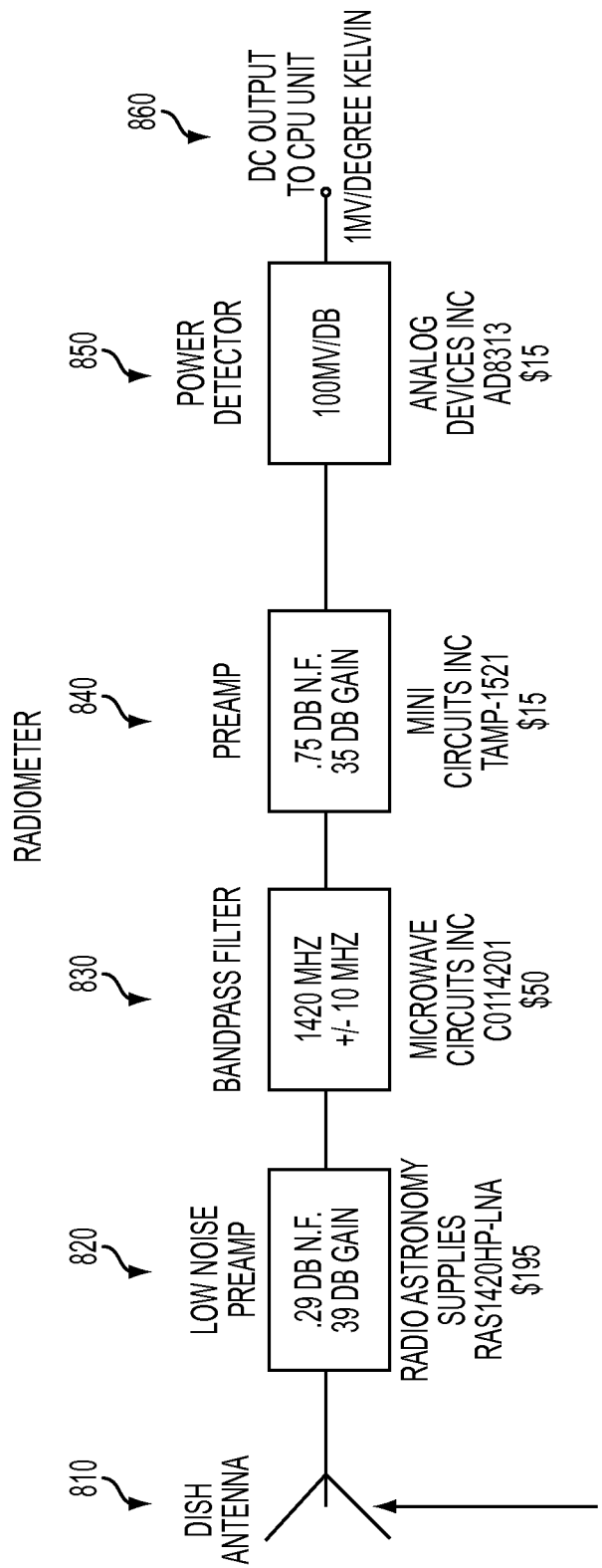
FIG. 8 shows a radiometer design in accordance with one embodiment of a passive microwave receiver operable at WARC protected frequency of 1420 MHz.

Referring now to FIG. 8, a schematic block diagram of a radiometer for operation at WARC frequency 1400 MHz will be discussed with regard to off-the-shelf components. For example, a directional thermally induced signal across at least 3 dB beamwidth is received at, for example, a dish or parabolic antenna 810 and its received signal passed to low noise preamplifier 820, for example, the already introduced RAS 1420HP low noise amplifier. A bandpass filter 830 is available from Microwave Circuits as component C0114201 for passing 1420 MHz, plus or minus 10 MHz. The output of the bandpass filter is provided to preamp 840 providing 75 dB of gain NF or 35 dB gain overall, also available from Mini Circuits Inc. as component TAMP-1521. The signal output of pre-amp 840 is fed to power detector 850 which provides 100 millivolts/dB of power detection such that its output is 1 milli-volt per degree Kelvin. The power detector 850 may be an Analog Devices Inc. component AD8313. The signal voltage output may be digitally sampled and stored over time to provide a digital voltage signature to a central processor unit 4005 for comparison with known signatures expected in the direction pointed to by antenna 810.

Figure 9:
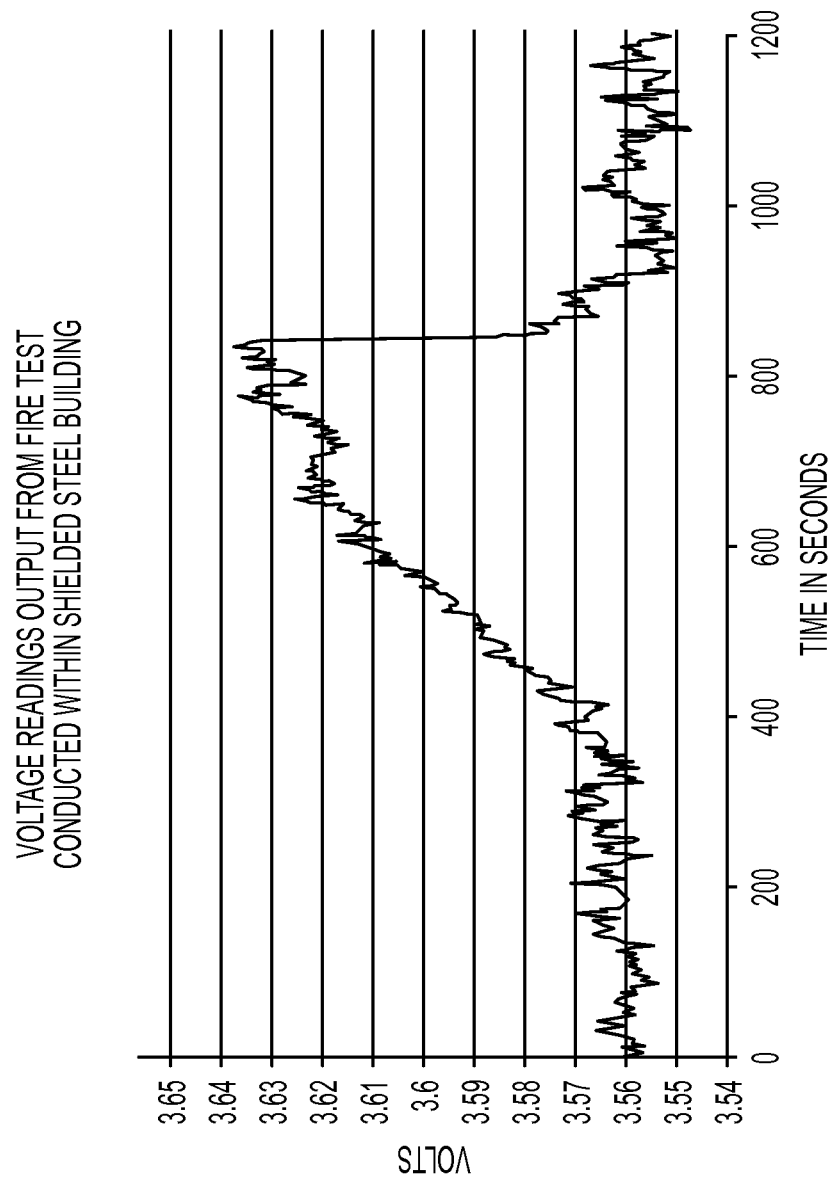
FIG. 9 depicts an exemplary set of voltage readings output from a fire test conducted within a shielded steel building by directing a parabolic antenna for receiving microwave frequencies simulating use of a noise-free WARC protected frequency at the test fire.
Figure 10:
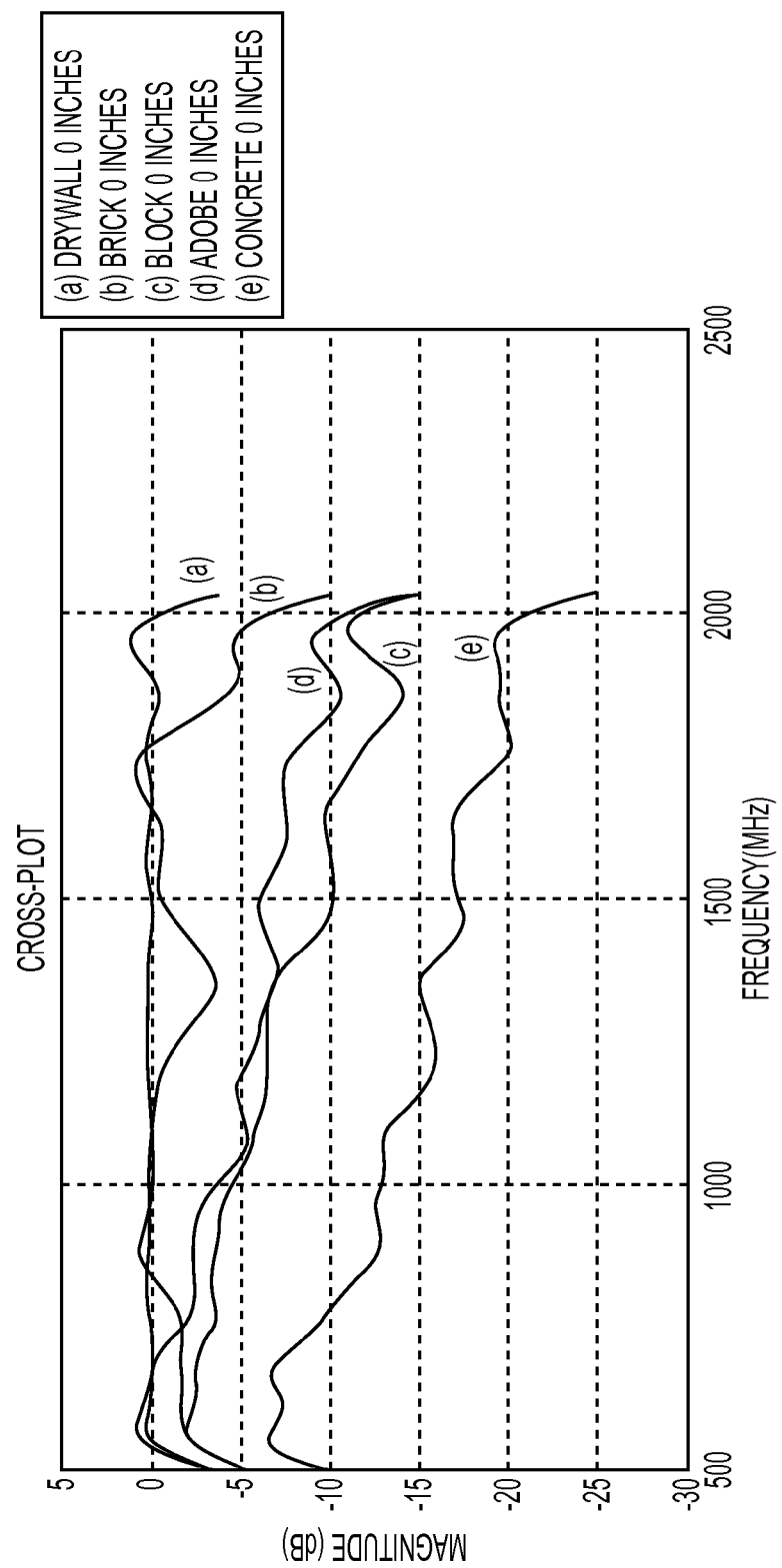
FIG. 10 provide a prior art graph of measured attenuation of microwave frequencies between 0.5 and 2.5 GHz for drywall, brick, block, adobe and cement showing that passive microwave radiation may be detected through obstacles, smoke and debris.

Referring to FIG. 9, a test fire was ignited and a directional passive microwave antenna used to monitor a fire during its ignition, growth, steady state, and decay stages. A graph of the voltage readings over time from this test fire is shown in FIG. 9 according to the microwave frequency channel measured. The voltage readings indicate and track a steady increase of temperatures over time until its peak and steady state after approximately 800 seconds, when the fire was then extinguished (decayed). As can be seen from the test data, a fire may take several minutes to rise to its peak. An explosive fire may take less than 120 seconds. Nevertheless, a passive microwave system as may be implemented or depicted in FIGS. 1, 3, 4, 6, 7 and/or 8 will detect a fire event and a signal processor will distinguish an explosive fire event in sufficient time to successfully apply and fully coat an exterior glass surface per FIG. 1 or 5. As suggested above, processor 4005 should consider all inputs available about a fire event including spectral line, smoke and infrared detection and possible heat imaging, wind direction and velocity and direction, weather, interior and exterior temperature and/or time of day obtained to make an automatic fuel fire event call. Also, the cost of an inadvertent or accidental alarm may be only to wash the protected window curtain along a calculated and pre-modeled length (such as about 30 to 100 meters) according to data input. For example, the fire event may be triangulated by plural directional antenna at different locations (per FIG. 3, 6) and located within one meter of its initiation. As necessary, a fire alarm may be transmitted to an airport fire department in the event the fire reaches a determined level. Moreover, conventional airport tarmac installed fire sprinkler and nozzle systems may be actuated to direct water to an aircraft being fueled and tanker vehicles to protect them from the detected fire and/or, if available, a water curtain established between the fire and the terminal.

Referring briefly to FIG. 11, a frequency range such as 0.5 to 3 GHz may be useful for in-the-wall or through-the-wall or above-the-ceiling directional passive microwave fire (and intrusion) detection. Passive microwave receivers may be invisibly located in the external ceiling/roof shown in FIG. 1, 3 or 6. Typical obstacles and debris (and smoke) may be easily penetrated by microwave radiation at these frequencies received by directional antennas located on towers or above a fire or other thermal event. Consequently, passive microwave detectors may receive passive microwave, in particular, passive microwave frequencies in the 1400 to 1427 MHz band of microwave frequencies, without impairment from smoke or flying debris caused by an explosion.

Figure 11A:
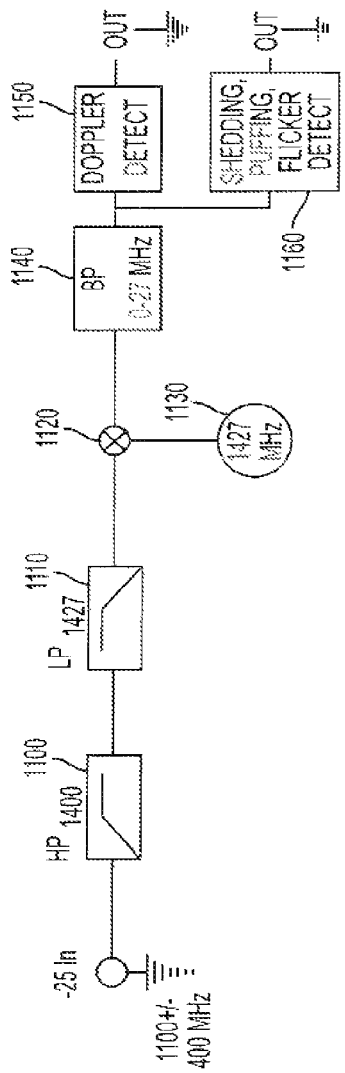
FIG. 11 provides in FIG. 11(A) an exemplary embodiment in which a given spectral line such as at 21 cm for hydrogen, a typical by-product of a fuel fire event, is captured and its Doppler effect determined as well as its so-called shedding, flicker or puff frequency at 0-30 Hz.
in FIG. 11(B) an exemplary embodiment is provided which may take an entire captured pass band of emission of a de-multiplexed passive microwave channel and detect at frequency increments of, for example, 3 MHz for continuous attenuation across an entire WARC protected band.

Referring now to FIG. 11, there is shown in FIG. 11A an exemplary embodiment for capture of the hydrogen spectral line at 21 cm and associated Doppler effect and shedding frequency characteristics. A passive microwave frequency of 1.420 GHz is one received frequency in the passive microwave region that is a WARC protected frequency (no noise is expected in a measured channel). A reception at 1.8 GHz can capture both the hydrogen line along with the hydroxyl radical collection of spectral lines which individually or together 1) can provide an indicator of a hot temperature and 2) are at a frequency that can be measured by a detector mounted per FIG. 1, 3 or 6 in such a way as to see through smoke or scattering debris per FIG. 10. A signal may be captured at between 100 MHz and 1.5 GHz and high-passed at 1.4 GHz filter 1100. This output is then low-passed at 1427 MHz at low-pass 1110. The output is then mixed at mixer 1120 with a 1427 GHz source and brought down to a baseband 27 MHz pass band. This pass band is then band-pass filtered at filter 1140 and, for example, the hydrogen line may be located and its Doppler effect studied at detector 1150. Its flicker, puff or shedding frequency may be detected at shedding frequency detector 1160 as a frequency that may show fire velocity, composition or location (for example, next to a wall) as is known in the art (as well as serve as another fire "signature" for distinguishing a fire from a false alarm or another fire). This same circuit may be applied in different form for detection of hydroxyl radical, HCl or any other spectral line detectable by a passive microwave receiver designed to detect its presence in a fire. Thus, for example, frequencies for both hydrogen and hydroxyl radical can be similarly detected by a single detector operating at, for example, 2 GHz.

Figure 11B:
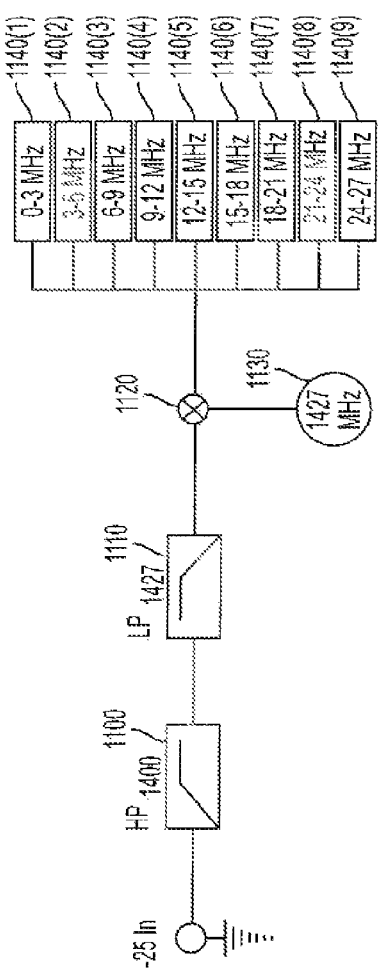

In FIG. 11(B), similar reference numerals denote similar elements. The hydrogen line is again captured, but the 27 MHz passband is sampled across the 27 MHz spectrum for example to compare against a predetermined black body characteristic for this spectrum. Though there is little variation between a human body and a fire at this frequency as to black body radiation per this apparatus, there is very large signal to noise ratio because there is no expected man-made noise at this frequency; consequently, small emission of H or OH may be quantified. By way of example, a plurality of filters each with a 3 MHz passband may capture channels between 0 and 27 MHz within a 27 MHz spectrum. The circuit of FIG. 11(B) could just as easily capture 0.5 to 3 GHz and comprise an in-the wall or through-the-wall or above the ceiling directional detector for detecting a constantly increasing black body or spectral emission with increasing frequency in comparison to a stored human body or a fire (candle, gas, fuel, wood or other characteristic fire) signature and one or the other thus distinguished by black body and spectral emission signature. On a broader scale, black body and spectral emission may be measured by passive microwave detection from frequencies as low as 0.5 to 3 GHz for in-the-wall or through-the-wall detection and 0.5 to 1000 GHz for mounted on-the-wall black body or spectral or spectral line emission. Because of the similar front ends of the circuits of FIGS. 11(A) and (B), the analog or digital signal processing of the captured frequency bands may be performed remotely at a central processor 4005 shown in FIG. 4 using signatures and modeling and all expected characteristics data stored in associated memory 4013.

All patents, patent applications and articles or other reference materials referenced herein shall be deemed to be incorporated herein in their entirety as to their entire contents. Various embodiments and aspects of specifically disclosed embodiments and aspects thereof may come to mind of one of ordinary skill in the art from the above detailed discussion including the adaptation of, for example, an airport terminal, hangar, rental car facility, tarmac and the like environment for one described embodiment applied in, for example, a hotel or embassy or other building or protected space environment.

What we claim is:

1. An integrated fire detection, protection and suppression system for a glass structure comprising
    a plurality of passive microwave receivers comprising at least one directional receiver located for receiving passive microwave radiation emitted in an area to be protected including the glass structure, the passive microwave receivers operating within a range of microwave frequencies protected from active transmission in a geographic area encompassing a location of said plurality of passive microwave receivers and for outputting an electrical signal proportional to a passively received level of microwave radiation at a given time;
    a signal processor for receiving the electrical signal output of the plurality of passive microwave receivers and for comparing the received electrical signal output with a reference level and with characteristic fire event signature data and outputting a signal indicating a fire event responsive to the comparison;
    a memory connected to the signal processor for storing the characteristic fire event signature data for one of a fuel fire, a motor fire, and an electrical fire;
    a sprinkler system for protecting the glass structure, the data processor actuating the sprinkler system for protecting the glass structure responsive to the fire event signal output.

2. The system of claim 1, said memory further storing one of an animal and a human radiation signature data for comparison with the received electrical signal output.

3. The system of claim 1, the glass structure having a length and a height, the sprinkler system comprising between ten and thirty sprinklers for protecting the length of the glass structure extending between 30 and 100 meters in a predetermined direction and the glass structure being near to an aircraft refueling location.

4. The system of claim 3, the sprinkler system comprising a deluge valve and a plurality of valves associated with said plurality of sprinklers.

5. The system of claim 1, the glass structure having an exterior side near to an aircraft refueling location and an interior side comprising interior wall portion of an airport terminal building further comprising an interior sprinkler system having sprinklers on the interior side of the glass structure.

6. The system of claim 5 wherein the glass structure comprises first and second panes of tempered and heat-strengthened glass.

7. The system of claim 1, the glass structure having an exterior side and an interior side, the system further comprising an infrared imaging sensor for thermal imaging of the exterior side of the glass structure.

8. The system of claim 1, the glass structure having an exterior side and an interior side, the system further comprising a smoke detector for detecting smoke near an exterior side of the glass structure.

9. The system of claim 1, the signal processor for running a fire dynamics simulator model and the memory for storing an airport model including each location of each receiver of the plurality of passive microwave receivers, each receiver of the plurality of passive microwave receivers having an associated unique identifier.

10. The system of claim 9 further comprising a wind velocity and direction meter associated with the glass structure to be protected, the wind velocity and direction meter for outputting wind velocity and direction data to the signal processor.

11. The system of claim 1 further comprising a wind velocity and direction meter associated with the glass structure to be protected, the wind velocity and direction meter for outputting wind velocity and direction data to the signal processor.

12. A method of detecting a particular fire event at a particular location and suppressing a fire associated with the detected fire event comprising
storing a plurality of different fire event signatures in memory including at least a vehicle fire signature, an electrical fire signature and a fuel fire signature, such signatures characterized by a received electrical signal level of a microwave frequency over time, the microwave frequency being selected as a frequency protected from active transmission in a geographic area encompassing the particular location of the fire event;
detecting the electrical signal level corresponding to the microwave frequency received at a given time from at least one directional passive microwave receiver located in the geographic area encompassing the particular location of the fire event, the electrical signal level for transmission to a central processor;
comparing a value of the electrical signal level of the detected microwave frequency over time at the central processor with the different fire event signatures;
determining a particular fire event signature and the particular location of the particular fire event, the particular location of the particular fire event being proximate to a glass structure, the determination being made from the comparison of the electrical signal level of the detected microwave frequency with the different stored fire event signatures at a given time at the central processor; and
selectively actuating a sprinkler system for protecting the glass structure responsive to the determination of the particular fire event signature of the particular fire event at the particular location, the particular location being proximate to the glass structure.

13. The method of claim 12 further comprising receiving exterior temperature data associated with the glass structure for use by the central processor for comparing the electrical signal level of the detected microwave frequency with the different stored fire event signatures as a temperature data reference level.

14. The method of claim 13 further comprising receiving wind velocity and direction data associated with the glass structure for use by the central processor for determining a portion of the glass structure to be protected with reference to the determined particular location of the fire event.

15. The method of claim 13 wherein the determination of the particular fire event signature and the particular location of the particular fire event comprises using a fire dynamics simulator.

16. The method of claim 13 further comprising storing a terminal and tarmac model in memory including a building structure including the glass structure, an associated exterior of the building structure including the glass structure and a location of the at least one directional passive microwave receiver with respect to the building structure or with respect to its associated exterior.

17. The method of claim 13, the glass structure having length and height, the selectively actuated sprinkler system actuation including actuating between ten and thirty sprinklers for protecting the length of the glass structure extending between 30 and 100 meters in a predetermined direction, the between ten and thirty sprinklers comprising a sprinkler system zone proximate to the particular fire event at the particular location.

18. The method of claim 13 wherein the at least one directional passive microwave receiver comprises first and second directional passive microwave receivers, the first and second directional passive microwave receivers being operable to detect the particular fire event at the particular location, the particular location of the particular fire event being determined by triangulation.

19. An integrated fire detection, protection and suppression system comprising
a plurality of passive microwave receivers comprising at least one directional receiver including a directional antenna located for receiving passive microwave radiation emitted in an area to be protected in a direction of the antenna reception, the area to be protected comprising a building structure, the passive microwave receivers operating within a range of frequencies protected from active transmission in a geographic area encompassing a location of the plurality of passive microwave receivers and for outputting an electrical signal proportional to a passively received level of microwave radiation at a given time;
a signal processor for receiving the electrical signal output of the directional passive microwave receiver at the given time and for comparing the received electrical signal output with a reference level and with characteristic fire event signature data and outputting a signal indicating a particular fire event comprising one of a fuel fire event, an electrical fire event and a vehicle, fire event responsive to the comparison;
a memory connected to the signal processor for storing the characteristic fire event signature data;
a sprinkler system for protecting the building structure located within the area to be protected and susceptible to fire, the data processor actuating the sprinkler system for protecting the building structure responsive to the particular fire event signal output of the signal processor.

20. The system of claim 19, the system for protecting the building structure of the area to be protected and susceptible to fire, the building structure having walls and wherein said plurality of passive microwave receivers comprises first and second passive microwave receivers at different locations proximate to different walls of the building structure, the first and second passive microwave receivers having directional antennae pointed from respective walls toward a central area of the area to be protected of the building structure whereby the particular fire event may be detected and located in the area to be protected of the building structure.

* * * * *